United States Patent
Furmanczyk et al.

(10) Patent No.: US 9,419,538 B2
(45) Date of Patent: Aug. 16, 2016

(54) AC/DC POWER CONVERSION SYSTEM AND METHOD OF MANUFACTURE OF SAME

(75) Inventors: Kaz Furmanczyk, Marysville, WA (US); Randy Stephenson, Kirkland, WA (US)

(73) Assignee: Crane Electronics, Inc., Redmond, WA (US)

( * ) Notice: Subject to any disclaimer, the term of this patent is extended or adjusted under 35 U.S.C. 154(b) by 401 days.

(21) Appl. No.: 14/001,312

(22) PCT Filed: Feb. 24, 2012

(86) PCT No.: PCT/US2012/026465
§ 371 (c)(1),
(2), (4) Date: Oct. 2, 2013

(87) PCT Pub. No.: WO2012/116263
PCT Pub. Date: Aug. 30, 2012

(65) Prior Publication Data
US 2014/0016356 A1    Jan. 16, 2014

Related U.S. Application Data

(60) Provisional application No. 61/464,000, filed on Feb. 24, 2011.

(51) Int. Cl.
*H02M 7/06*    (2006.01)
*H02M 7/08*    (2006.01)
(Continued)

(52) U.S. Cl.
CPC ............... *H02M 7/066* (2013.01); *H02M 5/14* (2013.01); *H02M 7/068* (2013.01); *H02M 7/08* (2013.01); *H02M 7/043* (2013.01); *H02M 7/062* (2013.01)

(58) Field of Classification Search
CPC ......... H02M 5/10; H02M 5/14; H02M 7/043; H02M 7/06; H02M 7/062; H02M 7/064; H02M 7/066; H02M 7/068; H02M 7/08
See application file for complete search history.

(56) References Cited

U.S. PATENT DOCUMENTS 3,144,627 A    8/1964    Dunnabeck et al.
3,201,728 A    8/1965    McWhirter
(Continued)

FOREIGN PATENT DOCUMENTS

CN    101326705 A    12/2008
CN    201219235 Y    4/2009
(Continued)

OTHER PUBLICATIONS

Chinese Office Action, issued May 22, 2015, for Chinese Application No. 201280016631.1, 15 pages. (with Partial English Translation).
(Continued)

*Primary Examiner* — Fred E Finch, III
(74) *Attorney, Agent, or Firm* — Seed IP Law Group PLLC

(57) ABSTRACT

A power converter has a transformer having three primary windings configured to receive respective phases of a three-phase alternating current (AC) input signal in a delta configuration and three secondary windings, each split into two portions, wherein the portions are coupled together in a regular hexagon. The power converter includes a rectifier having a first rectifier path coupled between taps of the secondary windings and a positive output of the power converter and a second rectifier path coupled between taps of the secondary windings and a negative output. One of the secondary windings may be reversed with respect to the other secondary windings. The primary windings may be split with a corresponding secondary winding sandwiched between portions of the primary. One of the paths may have a different inductance than the other path.

34 Claims, 15 Drawing Sheets

(51) Int. Cl.
*H02M 5/14* (2006.01)
*H02M 7/04* (2006.01)

(56) References Cited

U.S. PATENT DOCUMENTS

| | | | |
|---|---|---|---|
| 4,128,868 A | 12/1978 | Gamble | |
| 4,255,784 A | 3/1981 | Rosa | |
| 4,337,569 A | 7/1982 | Pierce | |
| 4,354,162 A | 10/1982 | Wright | |
| 4,482,945 A * | 11/1984 | Wolf | H01F 27/2823 336/183 |
| 4,533,986 A | 8/1985 | Jones | |
| 4,618,812 A | 10/1986 | Kawakami | |
| 4,635,002 A | 1/1987 | Riebeek | |
| 4,683,527 A * | 7/1987 | Rosa | H02M 7/068 363/126 |
| 4,719,552 A | 1/1988 | Albach et al. | |
| 4,743,835 A | 5/1988 | Bossé et al. | |
| 4,920,309 A | 4/1990 | Szepesi | |
| 4,956,626 A | 9/1990 | Hoppe et al. | |
| 4,992,919 A | 2/1991 | Lee et al. | |
| 5,031,066 A | 7/1991 | Wagner et al. | |
| 5,068,774 A * | 11/1991 | Rosa | H02M 7/1552 363/129 |
| 5,148,357 A | 9/1992 | Paice | |
| 5,343,383 A | 8/1994 | Shinada et al. | |
| 5,396,165 A | 3/1995 | Hwang et al. | |
| 5,418,502 A | 5/1995 | Ma et al. | |
| 5,430,640 A | 7/1995 | Lee | |
| 5,436,550 A | 7/1995 | Arakawa | |
| 5,469,124 A | 11/1995 | O'Donnell et al. | |
| 5,481,225 A | 1/1996 | Lumsden et al. | |
| 5,521,807 A | 5/1996 | Chen et al. | |
| 5,631,822 A | 5/1997 | Silberkleit et al. | |
| 5,638,262 A | 6/1997 | Brown | |
| 5,691,629 A | 11/1997 | Belnap | |
| 5,694,303 A | 12/1997 | Silberkleit et al. | |
| 5,708,571 A | 1/1998 | Shinada | |
| 5,734,563 A | 3/1998 | Shinada | |
| 5,774,347 A | 6/1998 | Nakanishi | |
| 5,831,418 A | 11/1998 | Kitagawa | |
| 5,903,504 A | 5/1999 | Chevallier et al. | |
| 6,002,183 A * | 12/1999 | Iversen | H01L 23/467 257/691 |
| 6,002,318 A | 12/1999 | Werner et al. | |
| 6,038,148 A | 3/2000 | Farrington et al. | |
| 6,043,705 A | 3/2000 | Jiang | |
| 6,091,616 A | 7/2000 | Jacobs et al. | |
| 6,137,373 A | 10/2000 | Mori | |
| 6,141,232 A | 10/2000 | Weinmeier et al. | |
| 6,157,180 A | 12/2000 | Kuo | |
| 6,157,282 A | 12/2000 | Hopkinson | |
| 6,169,674 B1 * | 1/2001 | Owen | H02M 5/10 336/10 |
| 6,198,647 B1 * | 3/2001 | Zhou | H01F 30/14 363/154 |
| 6,232,832 B1 | 5/2001 | Kirkpatrick, II | |
| 6,236,194 B1 | 5/2001 | Manabe et al. | |
| 6,252,781 B1 | 6/2001 | Rinne et al. | |
| 6,304,463 B1 | 10/2001 | Krugly | |
| 6,335,872 B1 | 1/2002 | Zhou et al. | |
| 6,343,026 B1 | 1/2002 | Perry | |
| 6,456,511 B1 | 9/2002 | Wong | |
| 6,469,478 B1 | 10/2002 | Curtin | |
| 6,472,852 B1 | 10/2002 | Lethellier | |
| 6,492,890 B1 | 12/2002 | Woznlczka | |
| 6,545,534 B1 | 4/2003 | Mehr | |
| 6,563,719 B1 | 5/2003 | Hua et al. | |
| 6,643,151 B1 | 11/2003 | Nebrigic et al. | |
| 6,697,955 B1 | 2/2004 | Malik et al. | |
| 6,707,650 B2 | 3/2004 | Diallo et al. | |
| 6,760,235 B2 | 7/2004 | Lin et al. | |
| 6,798,177 B1 | 9/2004 | Liu et al. | |
| 6,839,246 B1 | 1/2005 | Zhang et al. | |
| 6,850,048 B2 | 2/2005 | Orr et al. | |
| 6,998,901 B2 | 2/2006 | Lee | |
| 7,012,413 B1 | 3/2006 | Ye | |
| 7,061,212 B2 | 6/2006 | Phadke | |
| 7,095,215 B2 | 8/2006 | Liu et al. | |
| 7,129,808 B2 | 10/2006 | Roebke et al. | |
| 7,164,584 B2 | 1/2007 | Walz | |
| 7,183,727 B2 | 2/2007 | Ferguson et al. | |
| 7,199,563 B2 | 4/2007 | Ikezawa | |
| 7,202,644 B2 | 4/2007 | Nitta et al. | |
| 7,206,210 B2 | 4/2007 | Harnett et al. | |
| 7,227,754 B2 | 6/2007 | Griesinger et al. | |
| 7,242,168 B2 | 7/2007 | Müller et al. | |
| 7,286,376 B2 | 10/2007 | Yang | |
| 7,304,828 B1 | 12/2007 | Shvartsman | |
| 7,339,804 B2 | 3/2008 | Uchida | |
| 7,369,024 B2 | 5/2008 | Yargole et al. | |
| 7,515,005 B2 | 4/2009 | Dan | |
| 7,564,706 B1 | 7/2009 | Herbert | |
| 7,577,539 B2 | 8/2009 | Hubanks et al. | |
| 7,579,901 B2 | 8/2009 | Yamashita | |
| 7,602,273 B2 | 10/2009 | Yoshikawa | |
| 7,616,459 B2 | 11/2009 | Huynh et al. | |
| 7,730,981 B2 | 6/2010 | McCabe et al. | |
| 7,742,318 B2 | 6/2010 | Fu et al. | |
| 7,786,712 B2 | 8/2010 | Williams | |
| 7,847,519 B2 | 12/2010 | Ho | |
| 7,884,317 B2 | 2/2011 | Casper | |
| 7,893,804 B2 | 2/2011 | Kaveh Ahangar et al. | |
| 8,009,004 B2 | 8/2011 | Ahangar et al. | |
| 8,040,699 B2 | 10/2011 | Huynh et al. | |
| 8,067,992 B2 | 11/2011 | Chen et al. | |
| 8,072,195 B2 | 12/2011 | Aan De Stegge et al. | |
| 8,102,162 B2 | 1/2012 | Moussaoui et al. | |
| 8,279,631 B2 | 10/2012 | Yang | |
| 8,358,118 B2 | 1/2013 | Chen et al. | |
| 8,378,647 B2 | 2/2013 | Yonezawa et al. | |
| 8,508,195 B2 | 8/2013 | Uno | |
| 8,520,415 B1 | 8/2013 | Krishnamoorthy et al. | |
| 8,552,589 B2 | 10/2013 | Ghosh et al. | |
| 8,570,006 B2 | 10/2013 | Moussaoui et al. | |
| 8,649,128 B2 | 2/2014 | Wang et al. | |
| 8,736,240 B2 | 5/2014 | Liu et al. | |
| 8,764,247 B2 | 7/2014 | Pattekar et al. | |
| 8,810,214 B2 | 8/2014 | Van Dijk et al. | |
| 8,873,263 B2 | 10/2014 | Feng et al. | |
| 9,030,178 B2 | 5/2015 | Chang et al. | |
| 9,106,142 B2 | 8/2015 | Huang et al. | |
| 2002/0015320 A1 | 2/2002 | Mochikawa et al. | |
| 2002/0071300 A1 | 6/2002 | Jang et al. | |
| 2004/0125523 A1 | 7/2004 | Edwards et al. | |
| 2004/0178776 A1 | 9/2004 | Hansen et al. | |
| 2004/0178846 A1 | 9/2004 | Kuyel et al. | |
| 2006/0039172 A1 | 2/2006 | Soldano | |
| 2006/0132105 A1 | 6/2006 | Prasad et al. | |
| 2006/0212138 A1 | 9/2006 | Zhang | |
| 2006/0220629 A1 | 10/2006 | Saito et al. | |
| 2006/0227582 A1 * | 10/2006 | Wei | H02M 7/06 363/126 |
| 2007/0152644 A1 | 7/2007 | Vinn | |
| 2007/0257733 A1 | 11/2007 | Laletin | |
| 2008/0031014 A1 | 2/2008 | Young | |
| 2008/0197724 A1 | 8/2008 | Cullen et al. | |
| 2009/0067206 A1 | 3/2009 | Oguchi et al. | |
| 2009/0128110 A1 | 5/2009 | DeLurio et al. | |
| 2009/0154204 A1 | 6/2009 | Taylor | |
| 2009/0167432 A1 | 7/2009 | van den Heuvel | |
| 2009/0174381 A1 | 7/2009 | Ojanen et al. | |
| 2009/0231029 A1 | 9/2009 | Randlett | |
| 2009/0237057 A1 | 9/2009 | Dishman et al. | |
| 2009/0256547 A1 | 10/2009 | Akyildiz et al. | |
| 2009/0273431 A1 | 11/2009 | Hurst | |
| 2009/0302775 A1 | 12/2009 | Alexandrov | |
| 2009/0321045 A1 | 12/2009 | Hernon et al. | |
| 2009/0321046 A1 | 12/2009 | Hernon et al. | |
| 2010/0014330 A1 | 1/2010 | Chang et al. | |
| 2010/0117715 A1 | 5/2010 | Ariyama | |
| 2010/0176755 A1 | 7/2010 | Hoadley et al. | |
| 2010/0253309 A1 | 10/2010 | Xi et al. | |

(56) References Cited

U.S. PATENT DOCUMENTS

| | | | |
|---|---|---|---|
| 2011/0103105 A1* | 5/2011 | Wei | H01F 30/14 363/37 |
| 2011/0169471 A1 | 7/2011 | Nagasawa | |
| 2011/0241637 A1 | 10/2011 | Parker | |
| 2012/0268227 A1 | 10/2012 | Howes et al. | |
| 2013/0020867 A1 | 1/2013 | Hughes et al. | |
| 2013/0021008 A1 | 1/2013 | Hume et al. | |
| 2013/0021009 A1 | 1/2013 | Waltman et al. | |
| 2013/0021108 A1 | 1/2013 | Hughes | |
| 2013/0021702 A1 | 1/2013 | Waltman et al. | |
| 2013/0049918 A1 | 2/2013 | Fu et al. | |
| 2013/0121043 A1* | 5/2013 | Pietkiewicz | H02M 1/126 363/40 |
| 2013/0245854 A1 | 9/2013 | Rinne et al. | |
| 2013/0299148 A1 | 11/2013 | Hernon et al. | |
| 2014/0015629 A1* | 1/2014 | Zeng | H02P 13/06 336/5 |
| 2014/0070887 A1 | 3/2014 | Lam et al. | |
| 2014/0118946 A1 | 5/2014 | Tong et al. | |
| 2014/0192561 A1 | 7/2014 | Plesnik | |
| 2014/0327417 A1 | 11/2014 | Zhu et al. | |
| 2015/0137412 A1 | 5/2015 | Schalansky | |

FOREIGN PATENT DOCUMENTS

| | | | |
|---|---|---|---|
| CN | 103582997 A | 2/2014 | |
| CN | 104704742 A | 6/2015 | |
| JP | 55-1761 A | 1/1980 | |
| JP | 55-130208 A | 10/1980 | |
| JP | 62-32714 A | 2/1987 | |
| JP | 2001-320250 A | 11/2001 | |
| JP | 2002-076799 A | 3/2002 | |
| JP | 2007-263944 A | 10/2007 | |
| JP | 2008-185398 A | 8/2008 | |
| JP | 2009-100120 A | 5/2009 | |
| JP | 5030216 B2 | 9/2012 | |
| KR | 2008-019196 A | 3/2008 | |
| KR | 2008-101784 A | 11/2008 | |
| WO | 02/097974 A2 | 12/2002 | |
| WO | 2011/123680 A2 | 10/2011 | |
| WO | 2012/100810 A1 | 8/2012 | |
| WO | 2012/116263 A1 | 8/2012 | |
| WO | 2014/039982 A1 | 3/2014 | |
| WO | 2014/103298 A1 | 7/2014 | |

OTHER PUBLICATIONS

Cuon et al., "Dynamic Maneuvering Configuration of Multiple Control Modes in a Unified Servo System," Amendment filed Mar. 6, 2015, for U.S. Appl. No. 14/333,705, 11 pages.
International Search Report, mailed Aug. 31, 2015 for International Patent Application No. PCT/US2015/033321, 10 pages.
Lam et al., "Automatic Enhanced Self-Driven Synchronous Rectification for Power Converters," U.S. Appl. No. 14/848,859, filed Sep. 9, 2015, 53 pages.
Lam et al., "Automatic Enhanced Self-Driven Synchronous Rectification for Power Converters for Wide Input Range and High Output Voltage Without Tertiary Winding," U.S. Appl. No. 62/193,755, filed Jul. 17, 2015, 53 pages.
Parker et al., "Transformer-Based Power Converters With 3D Printed Microchannel Heat Sink," Office Action, dated Aug. 3, 2015, for U.S. Appl. No. 14/627,556, 11 pages.
Beta Dyne, "Synchronous Rectification," Application Note DC-006, DC/DC Converters, 2002, 3 pages.
Bottrill, "The Effects of Turning off a Converter with Self-Driven Synchronous Rectifiers," Power Guru, May 1, 2007, retrieved from http://www.powerguru.org/the-effects-of-turning-off-a-converter-with-self-driven-synchronous-rectifiers/ Jul. 10, 2015, 6 pages.
Jovanović et al., "Design Considerations for Forward Converter with Synchronous Rectifiers," Power Conversion Proceedings, pp. 340-350, Oct. 1993.
King et al., "Active Clamp Control Boosts Forward Converter Efficiency," *Power Electronics Technology*, pp. 52-55, Jun. 2003.

Mappus, "Synchronous Rectification for Forward Converters," Fairchild Semiconductor Power Seminar 2010-2011, 19 pages.
Michael T. Zhang, *Synchronous Rectification, Paralleling, Interleaving, Thermal*, Chapter Two, "Synchronous Rectification," pp. 9-72, PDF created Feb. 20, 1997.
Peter, "Synchronous rectifier in DC/DC converters," Oct. 5, 2009, retrieved from http://www.posterus.sk/?p=2535, on Jul. 10, 2015, 11 pages.
Plesnik, "A New Method for Driving Synchronous Rectifiers," IEICE/IEEE Intelec'03, Oct. 19-23, Yokohama, Japan, pp. 274-281, 2003.
Hughes, "Oscillator Apparatus and Method With Wide Adjustable Frequency Range," Amendment filed Apr. 24, 2014, for U.S. Appl. No. 13/185,152, 8 pages.
Hughes, "Oscillator Apparatus and Method With Wide Adjustable Frequency Range," Notice of Allowance mailed Jul. 14, 2014, for U.S. Appl. No. 13/185,152, 12 pages.
Lam et al., "Dynamic Maneuvering Configuration for Multiple Control Modes in a Unified Servo System," U.S. Appl. No. 14/333,705, filed Jul. 17, 2014, 36 pages.
Lam et al., "Impedance Compensation for Operational Amplifiers Used in Variable Environments," Notice of Allowance mailed Jun. 27, 2014, for U.S. Appl. No. 13/609,107, 9 pages.
"Application Guide: Theory of Operation," MicroPower Direct, URL=http://micropowerdirect.com/PDF%20Files/Application%20Notes/Power%20Supply%20Theory%20of%20Operation.pdf, download date Apr. 18, 2012, 6 pages.
"Buck converter," URL=http://en.wikipedia.org/wiki/Buck_converter, download date Jun. 23, 2011, 14 pages.
"Maximum Flexible Power (MFP) Single Output Point of Load: Technical Preview—3—6 VDC IN, 7 Amp, Non-Isolated DC/DC Converter," Crane Aerospace & Electronics Power Solutions, 2010, 17 pages.
"Step-gap "E" core swing chokes: Improved regulation and higher efficiency are possible when operating at minimum current levels," Technical Bulletin: Bulletin FC-S4, Magnetics Division, Spang & Company, Butler, Pennsylvania, 2001, 4 pages.
"Synchronous Rectification Aids Low-Voltage Power Supplies," Maxim Integrated Products, URL=http://www.maxim-ic.com/appnotes/index.mvp/id/652, download date Jun. 22, 2011, 6 pages.
eCircuit Center, "Op Amp Offset Adjustment," 2002, retrieved from http://www.ecircuitcenter.com/Circuits/op_voff/op_voff2.htm on Mar. 26, 2012, 3 pages.
eCircuit Center, "Op Amp Offset Voltage," 2002, retrieved from http://www.ecircuitcenter.com/Circuits/op_voff/op_voff.htm on Mar. 26, 2012, 3 pages.
Hughes, "Oscillator Apparatus and Method With Wide Adjustable Frequency Range," Office Action mailed Jun. 5, 2013, for U.S. Appl. No. 13/185,152, 17 pages.
Hughes, "Oscillator Apparatus and Method With Wide Adjustable Frequency Range," Amendment filed Oct. 7, 2013, for U.S. Appl. No. 13/185,152, 15 pages.
Hughes, "Oscillator Apparatus and Method With Wide Adjustable Frequency Range," Office Action mailed Jan. 28, 2014, for U.S. Appl. No. 13/185,152, 15 pages.
Hughes et al., "Self Synchronizing Power Converter Apparatus and Method Suitable for Auxiliary Bias for Dynamic Load Applications," Notice of Allowance mailed May 14, 2014, for U.S. Appl. No. 13/185,217, 10 pages.
Hume et al., "Power Converter Apparatus and Method With Compensation for Light Load Conditions," Office Action mailed Nov. 6, 2013, for U.S. Appl. No. 13/185,142, 11 pages.
International Search Report, mailed Oct. 14, 2011, for PCT/US2011/030778, 3 pages.
International Search Report, mailed Dec. 20, 2013, for PCT/US2013/058784, 3 pages.
Kristjansson et al., "Solutions to Today's Low Voltage Power Design Challenges Using High-Efficiency, Non-Isolated Point of Load Converters: A Discussion of the Interpoint™ MFP Series™ Point of Load Converter," Crane Aerospace & Electronics, Power Solutions—Interpoint Products, Redmond, WA, Oct. 2011, Revised Jan. 2012, 25 pages.

(56) References Cited

OTHER PUBLICATIONS

Lam et al., "Impedance Compensation for Operational Amplifiers Used in Variable Environments," Office Action mailed Feb. 7, 2014, for U.S. Appl. No. 13/609,107, 11 pages.

Lam et al., "Impedance Compensation for Operational Amplifiers Used in Variable Environments," Amendment filed May 6, 2014, for U.S. Appl. No. 13/609,107, 12 pages.

Merriam-Webster, "Directly," retrieved from http://www.merriam-webster.com/dictionary/directly, on Nov. 6, 2012, 1 page.

Ng, "Implementing Constant Current Constant Voltage AC Adapter by NCP1200 and NCP4300A," ON Semiconductor, Application Note, Publication Order Number: AND8042/D, Feb. 2001, 12 pages.

Nguyen et al., "Nulling Input Offset Voltage of Operational Amplifiers," Mixed Signal Products, Texas Instruments—Application Report SLOA045, Aug. 2000, pp. 1-15.

Parker, "Switched Capacitor Hold-Up Scheme for Constant Boost Output Voltage," Office Action mailed Mar. 28, 2012, for U.S. Appl. No. 12/751,067, 16 pages.

Parker, "Switched Capacitor Hold-Up Scheme for Constant Boost Output Voltage," Amendment filed Jul. 30, 2012, for U.S. Appl. No. 12/751,067, 18 pages.

Parker, "Switched Capacitor Hold-Up Scheme for Constant Boost Output Voltage," Office Action mailed Nov. 16, 2012, for U.S. Appl. No. 12/751,067, 20 pages.

Parker, "Switched Capacitor Hold-Up Scheme for Constant Boost Output Voltage," Amendment filed Jan. 16, 2013, for U.S. Appl. No. 12/751,067, 15 pages.

Parker, "Switched Capacitor Hold-Up Scheme for Constant Boost Output Voltage," Amendment filed Feb. 15, 2013, for U.S. Appl. No. 12/751,067, 15 pages.

Parker, "Switched Capacitor Hold-Up Scheme for Constant Boost Output Voltage," Office Action mailed Jul. 30, 2013, for U.S. Appl. No. 12/751,067, 18 pages.

Parker, "Switched Capacitor Hold-Up Scheme for Constant Boost Output Voltage," Amendment filed Oct. 30, 2013, for U.S. Appl. No. 12/751,067, 19 pages.

Parker, "Switched Capacitor Hold-Up Scheme for Constant Boost Output Voltage," Notice of Allowance mailed Feb. 3, 2014, for U.S. Appl. No. 12/751,067, 11 pages.

Pascu, "Error Amplifier with Forced Equilibrium Adaptor," Kepco, Inc., retrieved from http://www.kepcopower.com/equibm2.htm#fig2, dated May 22, 2014, 8 pages.

Waltman et al., "Power Converter Apparatus and Method With Compensation for Current Limit/Current Share Operation," Office Action mailed Dec. 17, 2013, for U.S. Appl. No. 13/185,172, 15 pages.

Waltman et al., "Power Converter Apparatus and Method With Compensation for Current Limit/Current Share Operation," Amendment filed Mar. 17, 2014, for U.S. Appl. No. 13/185,172, 16 pages.

Waltman et al., "Power Converter Apparatus and Method With Compensation for Current Limit/Current Share Operation," Notice of Allowance mailed May 8, 2014, for U.S. Appl. No. 13/185,172, 10 pages.

Waltman et al., "Power Converter Apparatus and Methods," U.S. Appl. No. 61/508,937, filed Jul. 18, 2011, 139 pages.

Written Opinion, mailed Oct. 14, 2011, for PCT/US2011/030778, 5 pages.

Written Opinion, mailed Dec. 20, 2013, for PCT/US2013/058784, 4 pages.

Xing et al., "Power System Architecture with Back-Up Power for Servers," ERC Program of the National Science Foundation, 5 pages.

"EMI Suppression Filters (EMIFIL®) for AC Power Lines," Murata Manufacturing Co., Ltd., Cat.No. C09E-14, downloaded on Feb. 21, 2014, 27 pages.

Coates, "Power supplies—3.0 Switched Mode Power Supplies," www.learnabout-electronics.org, 2007-2013, 20 pages.

Lam et al., "Dynamic Maneuvering Configuration for Multiple Control Modes in a Unified Servo System," Office Action mailed Dec. 23, 2014, for U.S. Appl. No. 14/333,705, 6 pages.

Manfredi et al., "Additive Manufacturing of Al Alloys and Aluminum Matrix Composites (AMCs)," in Monteiro (ed.), *Light Metal Alloys Applications*, InTech, Jun. 11, 2014, 32 pages.

Mitsuya, "Basics of Noise Countermeasures—Lesson 14: Using Common Mode Choke Coils for Power Supply Lines," Murata Manufacturing Co., Ltd., Oct. 28, 2014, retrieved on Feb. 4, 2015, from http://www.murata.com/en-eu/products/emiconfun/emc/2014/10/28/en-20141028-p1, 3 pages.

Parker et al., "Integrated Tri-State Electromagnetic Interference Filter and Line Conditioning Module," U.S. Appl. No. 14/632,818, filed Feb. 26, 2015, 31 pages.

Parker et al., "Integrated Tri-State Electromagnetic Interference Filter and Line Conditioning Module," Office Action mailed Apr. 24, 2015, for U.S. Appl. No. 14/632,818, 11 pages.

Parker et al., "Transformer-Based Power Converters With 3D Printed Microchannel Heat Sink," U.S. Appl. No. 14/627,556, filed Feb. 20, 2015, 44 pages.

Parker et al., "Transformer-Based Power Converters With 3D Printed Microchannel Heat Sink," Office Action mailed Apr. 16, 2015, for U.S. Appl. No. 14/627,556, 9 pages.

Shrisavar, "Introduction to Power Management," Texas Instruments, Biracha Digital Power Ltd., 2014, 37 pages.

Waltman et al., "Input Control Apparatus and Method With Inrush Current, Under and Over Voltage Handling," Office Action mailed Jun. 17, 2014, for U.S. Appl. No. 13/185,210, 8 pages.

Lam et al., "Automatic Enhanced Self-Driven Synchronous Rectification for Power Converters," Notice of Allowance, for U.S. Appl. No. 14/848,859, mailed Dec. 10, 2015, 29 pages.

Extended European Search Report, dated Apr. 15, 2016 for corresponding European Application No. 13835620.9-1810/2893638, 7 pages.

Notice for Reasons for Rejections from the Japanese Patent Office with English Translation, dated Apr. 18, 2016, for corresponding Japanese Application No. 2015-531290, 5 pages.

\* cited by examiner

US 9,419,538 B2

AC/DC POWER CONVERSION SYSTEM AND METHOD OF MANUFACTURE OF SAME

CROSS-REFERENCE TO RELATED APPLICATIONS

This application claims benefit under 35 U.S.C. 119(e) to U.S. provisional patent application Ser. No. 61/464,000 filed Feb. 24, 2011, which is incorporated by reference herein, in its entirety.

BACKGROUND

1. Field

This disclosure generally relates to systems, methods and articles for converting alternating current (AC) to direct current (DC), such as AC/DC converters including transformers having primary and secondary windings and a rectifier.

2. Description of the Related Art

AC/DC converters are frequently used to convert alternating current sources into direct current power supplies. AC/DC converters, such as those used in avionics, typically include a transformer and a rectifier. In many applications, a transformer converts a first AC signal having a first voltage level to a second AC signal having a second voltage level, and a rectifier converts the second AC signal to a DC signal.

A transformer typically includes at least two windings of electrically conductive material such as wire. The windings are spaced sufficient close together such that an electrical current flow through one winding will induce an electrical current to flow in the other winding when it is connected to a load. Windings through which current is driven are typically denominated as primary windings, while windings in which current is induced are typically denominated as secondary windings. The transformer also may include a core, for example a magnetic or ferrous core extending between the windings.

A rectifier typically includes a plurality of diodes or thyristors configured to convert an AC signal to a DC signal. For example, a full-bridge rectifier may be employed to convert an AC signal to a DC signal. Additional devices may be employed to provide power conditioning, such as inter-phase transformers, balancing inductors, inter-phase reactors, filters, etc.

In many applications, transformer size and/or weight are important factors in realizing a practical and/or commercially successful device. For example, power converters for use in avionics typically must be lightweight and may need to occupy a small volume. Such applications, however, typically require high performance, such as high-current, low noise power conversion. Many applications may additionally, or alternatively, require low-cost power converters. Cost may be dictated by a number of factors including type of materials, amount of materials, and/or complexity of manufacture, among other factors.

BRIEF SUMMARY

In an embodiment, a power converter comprises a transformer having: three primary windings configured to receive respective phases of a three-phase alternating current (AC) input signal in a delta configuration; and three secondary windings each split into two portions, the portions of the secondary windings coupled together into a closed regular hexagon, with each portion of each secondary winding having at least two taps and the taps distributed at regular angles on the closed regular hexagon; a first rectification path coupled between taps of the secondary windings and a positive output of the power converter and having an inductance; and a second rectification path coupled between taps of the secondary windings and a negative output of the power converter and having an inductance different from the inductance of the first rectification path. In an embodiment, one of the secondary windings has a polarity opposite of a polarity of the other secondary windings. In an embodiment, one of the primary windings has a polarity opposite of the other primary windings and a secondary winding corresponding to the one primary winding has a polarity opposite of the other secondary windings. In an embodiment, the one primary winding and the corresponding secondary have a same polarity. In an embodiment, each primary winding is split in two portions and each secondary winding is sandwiched between two portions of a corresponding primary winding. In an embodiment, the first rectification path comprises 12 rectifiers, each coupled to a respective tap of the secondary windings through respective couplings have a first inductance, and the second rectification path comprises 12 rectifiers, each coupled to a respective tap of the secondary windings through respective couplings having a second inductance different that the first inductance. In an embodiment, the couplings of the first rectification path have a length different than a length of the couplings of the second rectification path. In an embodiment, the couplings of the first rectification path each comprise an inductor. In an embodiment, the first rectification path comprises: a first plurality of rectifiers having cathodes coupled together; an inductor coupled between the cathodes of the first plurality of rectifiers and the positive output; a second plurality of rectifiers having cathodes coupled together; and an inductor coupled between the cathodes of the second plurality of rectifiers and the positive output. In an embodiment, the first rectification path comprises a lead having a length different than a length of a corresponding lead of the second rectification path. In an embodiment, the inductance of the first rectification path is at least five times the inductance of the second rectification path. In an embodiment, the taps of the secondary windings are distributed at substantially identical central angles on the regular hexagon. In an embodiment, two taps on one portion of a secondary winding are on adjacent turns of the portion of the secondary winding. In an embodiment, the transformer comprises three substantially identical coils, each coil comprising one of the primary windings and a corresponding secondary winding. In an embodiment, the transformer comprises a transformer core and the coils are wound on the transformer core. In an embodiment, the coils are positioned next to each other in a row and a center coil has a polarity different than a polarity of the other coils.

In an embodiment, a method comprises: coupling three primary windings of a transformer together in a differential configuration to receive respective phases of a three-phase alternating current; coupling split portions of three secondary windings of the transformer together into a regular hexagonal configuration; providing a plurality of taps distributed at regular angles on the secondary windings, each split secondary winding portion having at least two taps; forming a first rectification path between the plurality of taps and a positive output, the first rectification path having an inductance; and forming a second rectification path between the plurality of taps and a negative output, the second rectification path having an inductance different than the inductance of the first rectification path. In an embodiment, the transformer comprises first, second and third coils and the method comprises: positioning the first, second and third coils together in a row with the second coil separating the first and third coils, secondary windings of the second coil having a polarity different than a polarity of secondary windings of the first coil and of the third coil. In an embodiment, the transformer comprises first, second and third coils and the method comprises: positioning the first, second and third coils together in a row with the second coil separating the first and third coils, the second coil having a polarity different than a polarity of the first coil and of the third coil. In an embodiment, the primary windings are split into first and second primary portions and the portions of the each secondary winding are sandwiched between first and second primary portions of a respective primary winding. In an embodiment, the inductance of the first rectification path is at least five times the inductance of the second rectification path.

In an embodiment, a power converter comprises: means for converting three-phase alternating current (AC) power signals into multi-phase AC power signals; first means for rectifying multi-phase AC power signals; second means for rectifying multiphase AC power signals; first means for coupling to couple the means for converting to the first means for rectifying and to couple the first means for rectifying to a first output of the power converter; and second means for coupling to couple the means for converting to the second means for rectifying and to couple the second means for rectifying to a second output of the power converter, wherein the first means for coupling has an inductance different than an inductance of the second means for coupling. In an embodiment, the means for converting comprises a transformer having: a primary including three primary windings configured to couple to respective phases of an AC power signal in a delta configuration; and a secondary including three secondary windings, each secondary winding corresponding to a respective primary winding and split into two portions, wherein the portions of the secondary windings are coupled together into a closed hexagon and each portion of a secondary winding comprises at least two taps. In an embodiment, two of the secondary windings have a polarity opposite of the other secondary winding. In an embodiment, one of the primary windings has a polarity opposite of the other primary windings and the corresponding secondary winding has a polarity opposite of the other secondary windings. In an embodiment, the primary windings are each split in two portions and the two portions of the corresponding secondary winding are sandwiched between the two portions of the corresponding primary winding. In an embodiment, the first means for coupling comprises an inductor coupled between the first means for rectifying and the means for converting. In an embodiment, the first means for coupling comprises an inductor coupled between the first means for rectifying and the first output of the power converter. In an embodiment, the means for converting is configured to convert three-phase alternating current (AC) power signals into twelve-phase AC power signals and the power converter is configured to provide a twenty-four pulse direct-current voltage. In an embodiment, the inductance of the first means for coupling is at least five times the inductance of the second means for coupling.

In an embodiment, a power converter comprises: means for converting three-phase alternating current (AC) power signals into twelve-phase AC power signals; first means for rectifying multi-phase AC power signals coupled to the means for converting; and second means for rectifying multi-phase AC power signals coupled to the means for converting and to the first means for rectifying multi-phase AC power signals. In an embodiment, the means for converting comprises a transformer having: a primary including three primary windings configured to couple to respective phases of an AC power signal in a delta or differential configuration; and a secondary including three secondary windings, each secondary winding corresponding to a respective primary winding and split into two portions, wherein the portions of the secondary windings are coupled together into a closed hexagon and each portion of a secondary winding comprises two taps. In an embodiment, one of the primary windings has a polarity opposite of the other primary windings and the corresponding secondary winding has a polarity opposite of the other secondary windings. In an embodiment, the one primary winding and the corresponding secondary have a same polarity. In an embodiment, the primary windings are each split in two portions. In an embodiment, the two portions of each secondary winding are sandwiched between the two portions of a corresponding primary winding. In an embodiment, the first means for rectifying multi-phase AC power signals is coupled between the means for converting and an output of the converter through a first rectification path, and second means for rectifying is coupled between the means for converting and the output of the converter through a second rectification path, wherein the first rectification path has an inductance different from an inductance of the second rectification path. In an embodiment, the first rectification path comprises an inductor coupled between the first means for rectifying multi-phase AC power signals and the means for converting. In an embodiment, the first rectification path comprises a plurality of inductors coupled between the first means for rectifying multi-phase AC power signals and the means for converting. In an embodiment, the first rectification path comprises an inductor coupled between the first means for rectifying multi-phase AC power signals and an output of the power converter. In an embodiment, the first means for rectifying multi-phase AC power signals comprises first and second branches and the first rectification path comprises a first inductor coupled between the first branch and an output of the power converter and a second inductor coupled between the second branch and the output of the power converter. In an embodiment, the first rectification path comprises a lead having a length different than a length of a corresponding lead of the second rectification path. In an embodiment, the inductor comprises a length of wire. In an embodiment, the inductance of the first rectification path is at least five times the inductance of the second rectification path. In an embodiment, the power converter does not employ inter-phase transformers in the rectification paths. In an embodiment, the power converter does not employ input inductors between an AC power source and the means for converting.

In an embodiment, a power converter comprises: a transformer having: three primary windings configured to receive respective phases of a three-phase alternating current (AC) input signal in a delta configuration; and three secondary windings, each split into two portions, wherein the portions are coupled together into a closed regular hexagon, each portion of each secondary has at least two taps and the taps are distributed at substantially identical central angles on the regular hexagon; a first rectifier branch coupled between taps of the secondary windings and a positive output of the power converter; and a second rectifier branch coupled between taps of the secondary windings and a negative output of the power converter. In an embodiment, one of the primary windings has a polarity opposite of the other primary windings and a secondary winding corresponding to the one primary winding has a polarity opposite of the other secondary windings. In an embodiment, the one primary winding and the corresponding secondary have a same polarity. In an embodiment, the primary windings are split in two portions. In an embodiment, each secondary winding is sandwiched between two portions of a corresponding primary winding. In an embodiment, the first rectifier branch has an inductance different from an inductance of the second rectifier branch. In an embodiment, the first rectifier branch comprises 12 rectifiers, each coupled to a respective tap of the secondary windings through respective couplings having a first inductance; and the second rectifier branch comprises 12 rectifiers, each coupled to a respective tap of the secondary windings through respective couplings having a second inductance different that the first inductance. In an embodiment, the couplings of the first rectifier branch have a length different than a length of the couplings of the second rectifier branch. In an embodiment, the couplings of the first rectifier branch each comprise an inductor. In an embodiment, the first rectifier branch comprises: a first plurality of rectifiers having cathodes coupled together; an inductor coupled between the cathodes of the first plurality of rectifiers and the positive output; a second plurality of rectifiers having cathodes coupled together; and an inductor coupled between the cathodes of the second plurality of rectifiers and the positive output. In an embodiment, the first rectifier branch comprises a lead having a length different than a length of a corresponding lead of the second rectifier branch. In an embodiment, the inductance of the first rectifier branch is at least five times an inductance of the second rectifier branch. In an embodiment, the power converter does not employ inter-phase transformers between the secondary windings and the outputs of the power converter.

In an embodiment, a transformer comprises: a primary including three primary windings configured to couple to respective phases of an AC power signal in a delta or differential configuration; and a secondary including three secondary windings, each secondary winding corresponding to a respective primary winding and split into two portions, wherein the portions of the secondary windings are coupled together into a closed hexagon and each portion of a secondary winding comprises two taps. In an embodiment, one of the primary windings has a polarity opposite of the other primary windings and the corresponding secondary winding has a polarity opposite of the other secondary windings. In an embodiment, the one primary winding and the corresponding secondary have a same polarity. In an embodiment, the primary windings are each split in two portions. In an embodiment, the two portions of each secondary winding are sandwiched between the two portions of a corresponding primary winding. In an embodiment, the closed hexagon is a closed regular hexagon and the taps are distributed at substantially identical central angles on the closed regular hexagon. In an embodiment, two taps on one portion of a secondary winding are on adjacent turns of the portion of the secondary winding. In an embodiment, the transformer comprises three identical coils, each coil comprising one of the primary windings and the corresponding secondary winding. In an embodiment, the transformer further comprises a transformer core, wherein the coils are wound on the transformer core. In an embodiment, the coils are positioned next to each other in a row and a center coil in the row has a polarity different than a polarity of the other coils. In an embodiment, a power converter comprises a transformer as described herein.

In an embodiment, a method comprises: forming first coil having a primary winding and a secondary winding split into first and second portions; forming a second coil having a primary winding and a secondary winding split into first and second portions; forming a third coil having a primary winding and a secondary winding split into first and second portions; coupling the primary windings of the first, second and third coils together in a differential configuration; and coupling the portions of the secondary windings together in a regular hexagonal configuration. In an embodiment, the method further comprises: positioning the first, second and third coils together in a row with the second coil separating the first and third coils. In an embodiment, the method further comprises: forming the second coil with a polarity different than a polarity of the first coil and of the second coil. In an embodiment, the primary windings of the coils are split into first and second primary portions and the portions of the secondary windings are sandwiched between the primary portions of the respective winding. In an embodiment, the method further comprises: providing a plurality of taps at regular angles on the secondary windings; forming a first rectification path; forming a second rectification path; and coupling the taps to the first and second rectification paths. In an embodiment, the first rectification path has an inductance different than an inductance of the second rectification path. In an embodiment, the inductance of the first rectification path is at least five times the inductance of the second rectification path.

BRIEF DESCRIPTION OF THE SEVERAL VIEWS OF THE DRAWINGS

In the drawings, identical reference numbers identify similar elements or acts unless the context indicates otherwise. The sizes and relative positions of elements in the drawings are not necessarily drawn to scale. For example, the shapes of various elements and angles may not be drawn to scale, and some of these elements may be enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with power converters, transformers, circuits employing transformers, and machinery useful in manufacturing power converters and transformers have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context indicates otherwise. It should also be noted that the term "or" is generally employed in its sense including "and/or" unless the context indicates otherwise.

The headings and Abstract of the Disclosure provided herein are for convenience only and do not interpret the scope or meaning of the embodiments.

Figure 1:
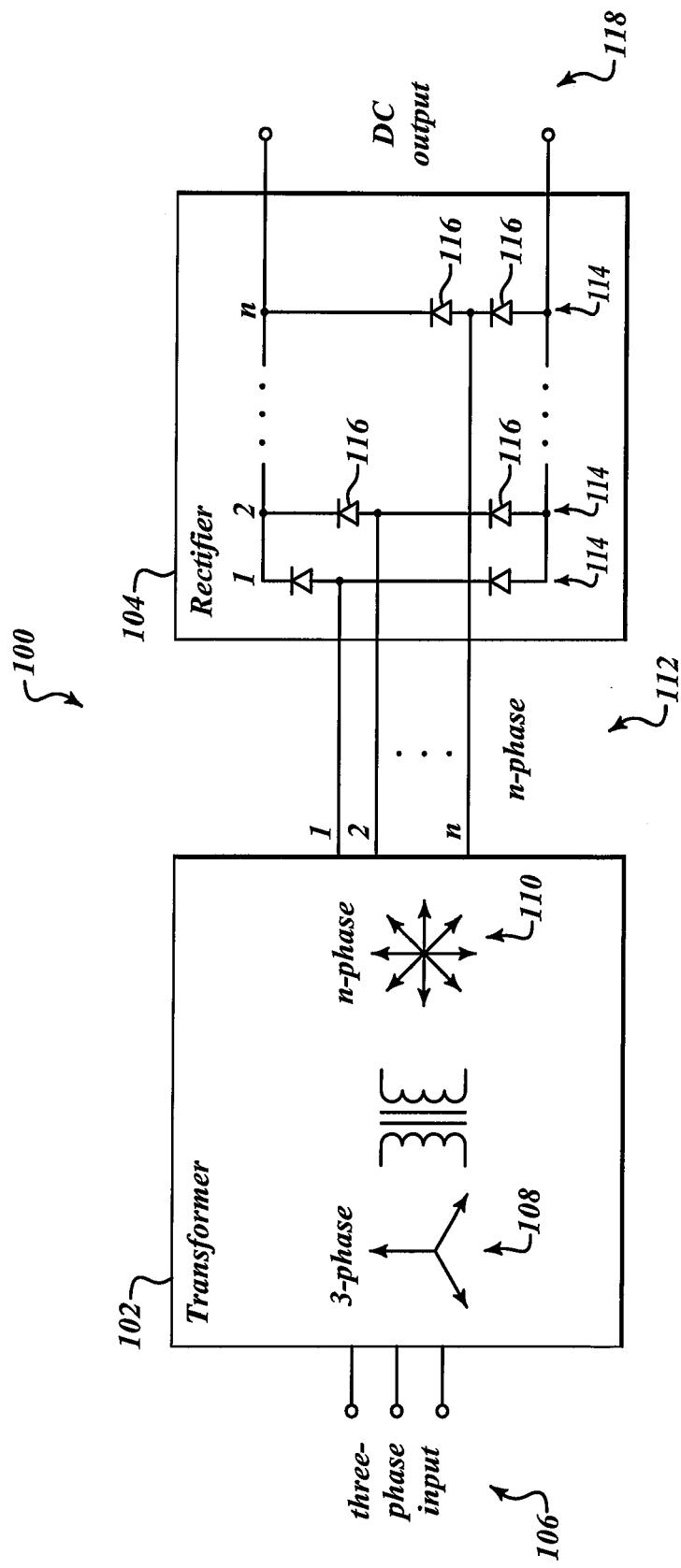
FIG. 1 is a schematic representation of a power converter.

FIG. 1 is a schematic representation of the building blocks of an example power converter 100 configured to convert a three-phase AC input to a DC output. The power converter 100 comprises a three-phase to n-phase transformer 102, and an n-pulse rectifier 104.

The transformer 102 is configured to receive a three-phase input signal 106 and comprises a three-phase primary 108 and an n-phase secondary 110. The transformer 102 is configured to provide an n-phase AC signal 112. The rectifier 104 comprises a plurality of branches 114 coupled to respective outputs of the n-phase AC signal 112. As illustrated, each branch comprises two diodes 116. Other rectifying devices may be employed, such as thyristors, etc. The rectifier 104 produces a DC output 118.

Higher pulse rectification generally provides lower ripple on the DC output and lower AC input current distortion, and thus generally results in a higher power-quality for a power converter. Generally, a 6-pulse converter topology may be considered acceptable for use in avionics equipment rated less than 35 VA. A 12-pulse converter topology is generally acceptable for a significant number of aerospace applications. A 24-pulse topology is typically used for higher power equipment or when a high power quality is desired or specified.

Avionics applications may typically employ transformer/rectifier units such as the power converter 100 of FIG. 1 to convert a three-phase AC power source, such as a 115 Volt AC power source operating at a fixed frequency, such as 400 Hz, a 115 Volt AC 360 Hz to 800 Hz variable frequency power source, a 230 Volt AC 360 Hz to 800 Hz variable frequency power source, etc., to a DC power supply, such as a 28 Volt DC power supply, etc. The load presented to the power converter may typically be between 100 amps and 400 amps. Typical functions for a power converter used in avionics may include supplying short-term overloads to clear downstream faults, providing galvanic isolation between an aircraft AC power source and a DC power supply, power conditioning to provide acceptable power quality on the AC and DC sides of the power converter for proper function of the aircraft power system and electrical loads, self-monitoring and reporting of faults, etc. Power converters, such as the power converter of FIG. 1, may be employed in other applications and be configured to provide other functions. Transformer/rectifier power converters may employ topologies using additional devices, such as inter-phase transformers, balancing inductors, inter-phase reactors, filters, etc., in order to provide the desired functionality, such as acceptable power quality.

Figure 1A:
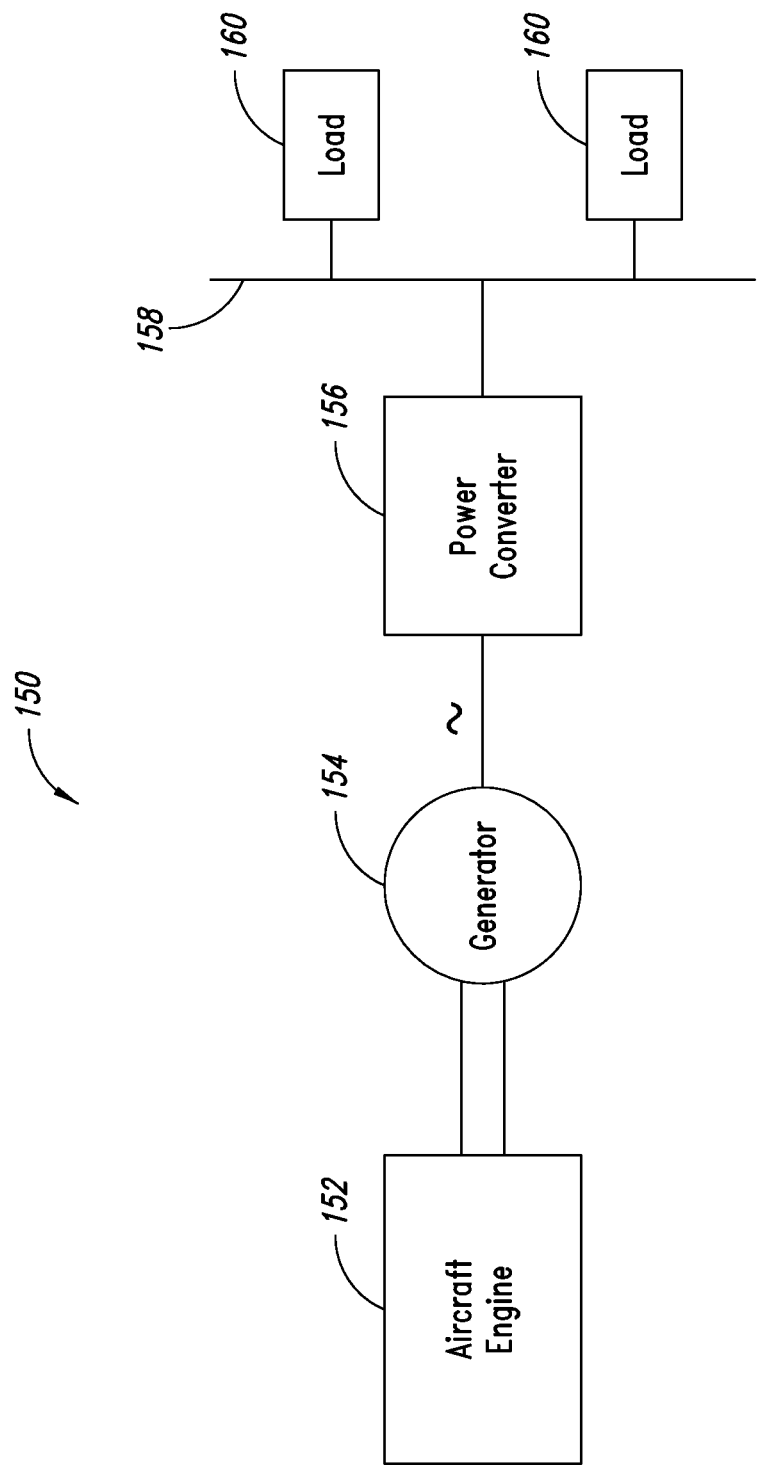
FIG. 1A is a schematic representation of an aircraft power system.

FIG. 1A is a functional block diagram of an example aircraft power system 150. As illustrated, an aircraft engine or turbine 152 is configured to drive a generator 154. The generator 154 is configured to provide an AC power signal to a power converter 156, such as the power converter 100 illustrated in FIG. 1. Typically the power generated on airplanes is 115 Volt AC power at 400 Hz or a variable frequency. Other voltage levels and frequencies may be employed. The power converter 156 is coupled to a DC bus 158 and is configured to provide a DC power signal to the DC bus 158. One or more loads 160, such as flight equipment, including critical flight equipment, may be coupled to the DC bus 158 and configured to draw power from the DC bus 158. Typically, flight equipment may use 28 Volt DC power to operate. Other output voltage levels may be employed.

Figure 2:
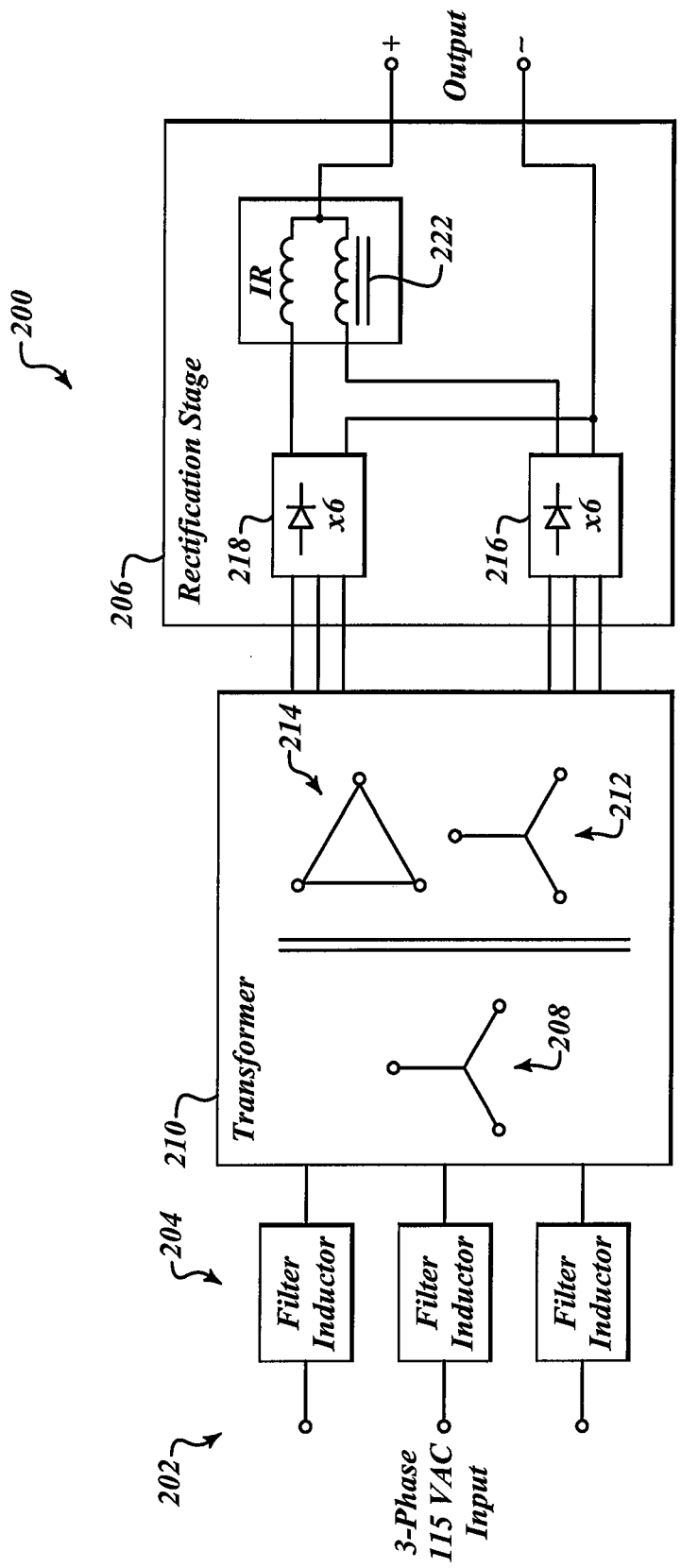
FIG. 2 is a schematic representation of a power converter.

FIG. 2 is an electrical schematic diagram of an example power converter 200 employing transformer/rectifier topology. The power converter comprises a transformer 210 having a primary 208 in a Wye, or star, configuration, a first secondary 212 in a Wye configuration and second secondary 214 in a Delta, or differential, configuration. The power converter 200 may be used, for example, in aerospace applications. The power converter 200 comprises an input 202 configured to receive a 3-phase AC power signal, for example, a 115 Volt AC signal. The input 202 is coupled to respective filter inductors 204 for each phase input configured to attenuate EMI emissions generated by a rectifier stage 206.

Outputs of the filter inductors 204 are coupled to respective windings of the primary 208 of the transformer 210, which has three windings in a Wye configuration. The first secondary 212 has three windings in a Wye configuration and the second secondary 214 has three windings in a Delta configuration.

The rectification stage 206 comprises a first full-wave rectification bridge 216 couple to the windings of the first secondary 212, a second full-wave rectification bridge 218 coupled to the windings of the second secondary 214, and an inter-phase transformer IPT 222. The voltages in the secondary transformer windings are shifted 30 degrees from each other, thus the power converter has power quality characteristics of a 12-pulse rectification. As can be seen from FIG. 2, three additional inductors and an IPT transformer were used in order to meet the desired power quality. These additional components add size, weight and cost to the power converter 200.

Figure 3:
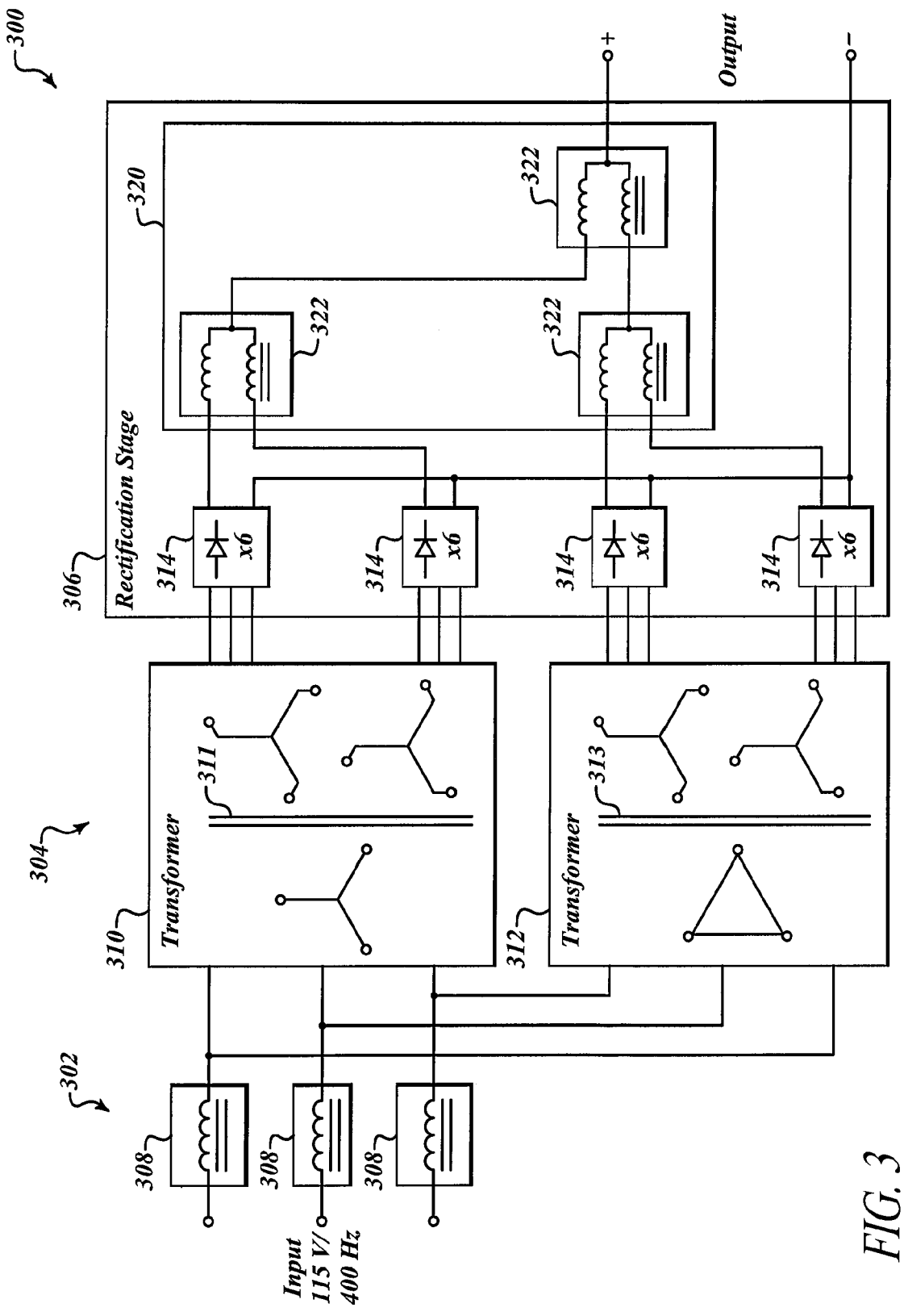
FIG. 3 is a schematic representation of a power converter.

FIG. 3 is an electrical schematic of a power converter 300 employing a Wye/Delta-Zig/Zag topology to obtain 24-pulse power quality characteristics. The power converter 300 may be used, for example, in aerospace applications. The power converter 300 comprises an input stage 302, a transformer stage 304, and a rectification stage 306.

The input stage 302 comprises three input inductors 308 configured to receive respective phases of a 3-phase AC power signal, for example, a 115 Volt AC signal at 400 Hz, etc. The input inductors 308 are configured to attenuate EMI emissions generated by the rectification stage 306. The transformer stage 304 comprises two transformers 310, 312.

Each transformer 310, 312 has a core 311, 313. The first transformer 310 has a Wye-Zig/Zag configuration in which the primary coupled to the input stage 302 is in a Wye configuration, and the first transformer 310 has two 3-phase secondaries coupled to the rectification stage 306 in a Zig/Zag configuration. The second transformer 312 has a Delta-Zig/Zag configuration in which the primary coupled to the input stage 302 is in a Delta configuration, and the second transformer 312 has two three-phase secondaries coupled to the rectification stage 306 in a Zig/Zag configuration.

The rectification stage 306 comprises four full-wave rectification bridges 314 coupled to the windings of respective secondary outputs of the first and second transformers 310, 312. The rectification stage 306 also comprises an inter-phase assembly 320, which as illustrated comprises three inter-phase transformers IPT 322. The power converter 300 has power quality characteristics of a 24-pulse rectification. As can be seen from FIG. 3, three input inductors, an additional transformer in the transformer stage with two secondaries in each transformer, and three IPT transformers were employed in order to meet the desired power quality. These additional components add size, weight and cost to the power converter 300.

Figure 4:
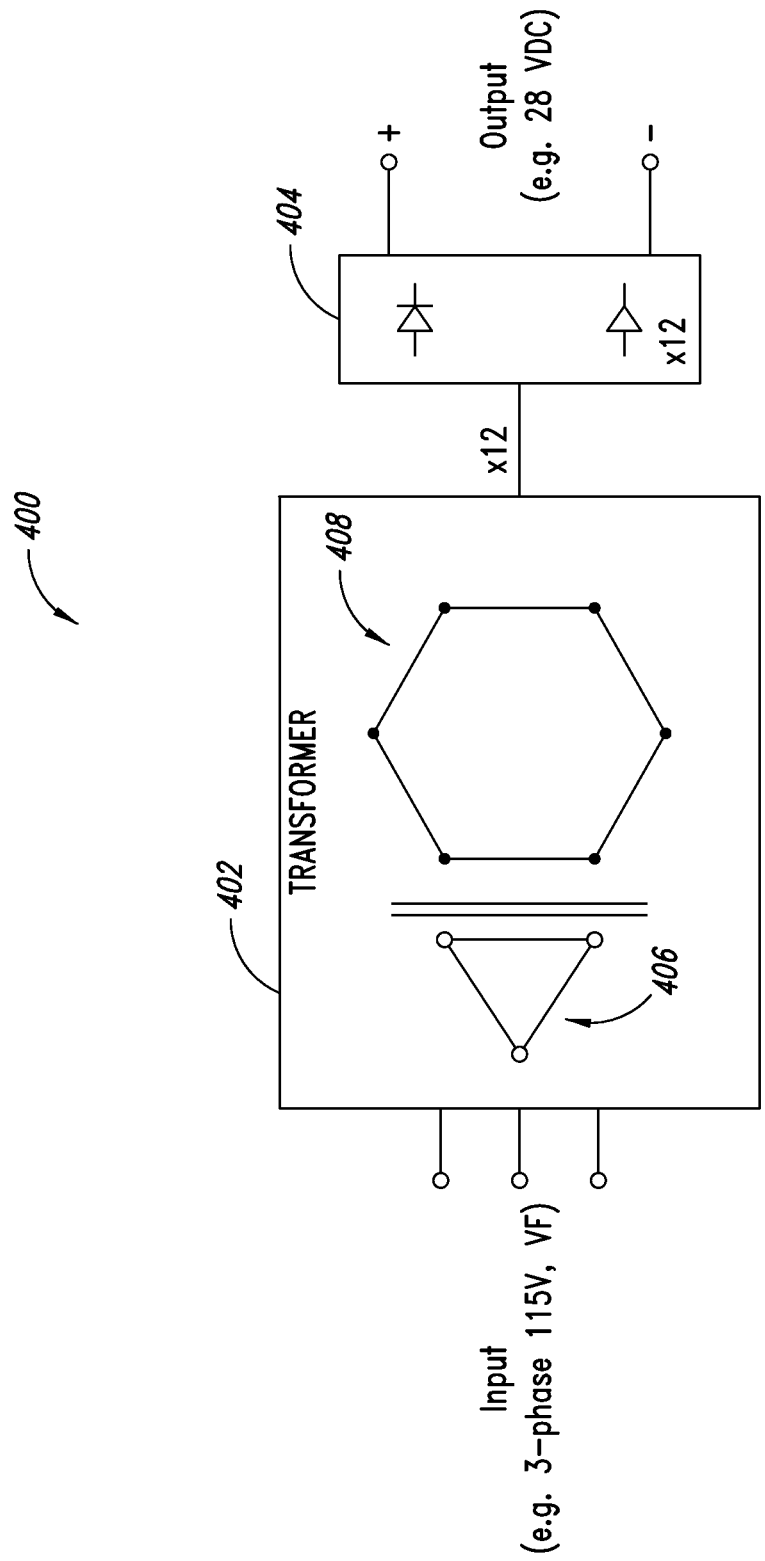
FIG. 4 is a schematic representation of a power converter.

FIG. 4 is an electrical schematic of a power converter 400 having a Delta-Hex topology. The power converter 400 has a transformer 402 and a rectifier 404. The transformer 402 has a primary 406 having three windings coupled in a Delta configuration to an AC input signal, for example a three-phase 115 Volt variable frequency signal, and a secondary 408 with three split windings coupled together in a hexagonal configuration. The windings of the secondary 408 are coupled to a full-wave rectifier bridge 404. An example of a power converter employing a Delta-Hex topology is described in U.S. Pat. No. 4,225,784 issued to Rosa.

Power converters in a Delta-Hex topology use fewer magnetic components than transformer/rectifier power converter topologies typically used in low-voltage/high-current applications for which high-quality power is desired or specified. While attempts have been made to use Delta-Hex power converter topologies in applications for which high-power quality was desired or specified, in practice the quality of power produced by Delta-Hex topology power converters has not been good enough for use in low-voltage/high-current power converter applications. For example, total harmonic distortion in a Delta-Hex power converter topology such as the one illustrated in FIG. 4 may typically be 12% or more, which is too high for many high current/low voltage applications, such as many aerospace applications.

Figure 5:
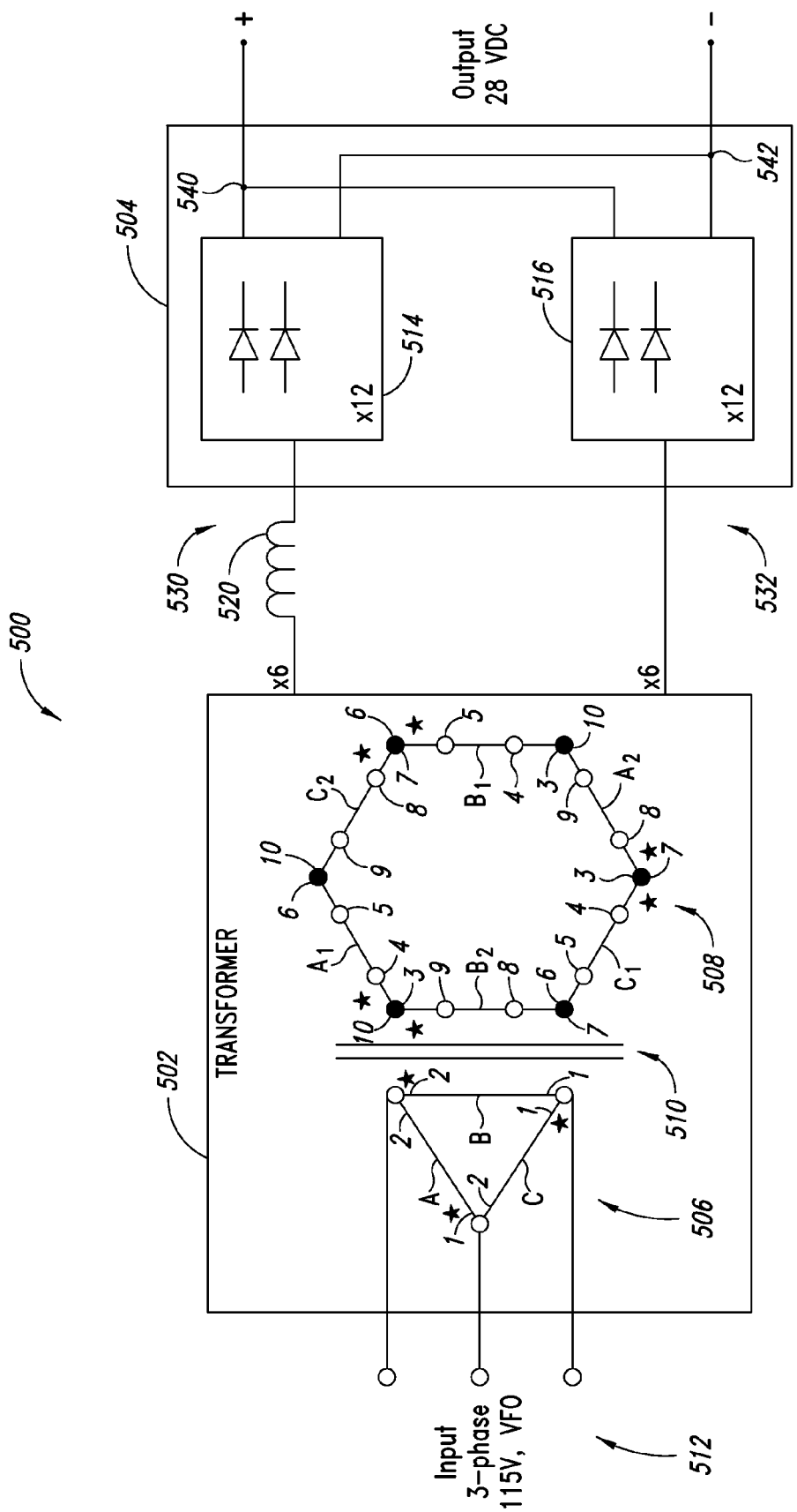
FIG. 5 is a schematic representation of an embodiment of a Delta-Hex power converter.

FIG. 5 is an electrical schematic of an embodiment of a power converter 500 employing a Delta-Hex topology. The power converter 500 comprises a transformer 502 and a rectifier stage 504. The transformer 502 comprises a primary 506, a secondary 508 and a core 510.

The primary 506 has first winding A, a second winding B, and a third winding C configured to couple to a 3-phase AC input signal 512 in a Delta configuration. Each winding A, B, C of the primary 506 has a respective first tap 1 and second tap 2. As illustrated, the taps 1, 2 of the windings A, B, C of the primary 506 are at the ends of the windings A, B, C. The reference number assigned to a tap or an end of a winding is not necessarily indicative of a turn count at the tap or end. The primary windings A, B, C typically have more than one turn. For example, a primary winding, such as winding A of primary 506, may have 61 turns in an embodiment. Other numbers of turns may be employed. A polarity of each winding A, B, C of the primary 506 is indicated by a star *.

The secondary 508 comprises a first split secondary winding $A_1$, $A_2$, a second split secondary winding $B_1$, $B_2$, and a third split secondary winding $C_1$, $C_2$, coupled together at the ends in a hexagonal configuration. A current in the first winding A of the primary 506 induces a current in the first split winding $A_1$, $A_2$ of the secondary 508, a current in the second winding B of the primary 506 induces a current in the second split winding $B_1$, $B_2$ of the secondary 508, and a current in the third winding C of the primary 506 induces a current in the third split winding $C_1$, $C_2$ of the secondary 508. Other currents, generally of a lesser magnitude, may be induced in other windings.

As illustrated, each split secondary winding has multiple turns, a first portion (e.g., $A_1$) with half of the turns, two ends 3, 6 and two taps 4, 5, and a second portion (e.g., $A_2$) with half of the turns, two ends 7, 10 and two taps 8, 9, with the taps 4, 5, 8, 9 configured to couple to the rectification stage 504. In an embodiment, 8 total turns may be employed, with two turns between taps on a same portion of a secondary winding. Other numbers of turns may be employed and the taps in embodiments with different numbers of turns may be at different turns of the windings. A polarity of each winding of the secondary 508 is indicated by a star *.

A polarity of the second winding B of the secondary 508 is reversed with respect to a polarity of the first winding A and of the third winding C of the secondary 508. For example, a polarity of the second split winding $B_1$, $B_2$ of the secondary 508 is reversed with respect to a polarity of the first split winding $A_1$, $A_2$ and of the third split winding $C_1$, $C_2$ of the secondary 508. Reversing the polarity at least partially cancels leakage fields from adjacent coils and makes it easier to manufacture by allowing shorter connections between adjacent coils, which may further reduce leakage currents, loses, parasitic effects, etc.

In Delta-Hex topologies like the one illustrated in FIG. 4, the minimum practical number of turns between taps on a same portion of a secondary winding was 3 or higher in order to obtain turn ratios closer to ideal ratios and thus avoid power quality issues arising from turn-ratio deviations. In an embodiment, reversing the polarity of the split second winding B1, B2 of the secondary 508 at least partially compensates for larger turn-ratio deviations and coil asymmetries, and thus facilitates obtaining acceptable power quality even when a minimum number of turns between taps coupled to the rectifier stage 504 is reduced to, for example, two turns. Reducing the number of turns between taps facilitates the use of transformers having windings with fewer turns, and thus facilitates smaller, lighter and less expensive transformers and power converters.

The power converter 500 comprises a first rectification path 530 and a second rectification path 532 between taps of the secondary windings of the transformer 502 and respective outputs of the power converter 500, with the first and second rectification paths 530, 532 having different inductances. This difference in inductance provides an additional phase shift in the currents. As illustrated, the rectifier stage 504 comprises a first rectifier 514 and a second rectifier 516, configured to provide full-wave rectification to each secondary output. The first and second rectifiers 514, 516 may comprise diodes, thyristors, snubbers, etc. The taps are configured to couple to the rectifier stage (e.g., taps 4, 5, 8, 9 of each of the secondary windings) in two ways, one of which has a higher inductance than the other, which is illustrated as an inductance 520. For example, a difference in inductance on the order of 5 micro-Henries may be employed. Other differences in inductances may be employed. In some embodiments, a desired difference in inductance may be obtained by simply providing half of the secondary outputs with longer leads than the other half of the secondary outputs. The difference in inductance, such as a value of the inductance 520, may be selected such that the voltages/currents in the outputs of secondary 508 of the transformer 502 are shifted approximately 15 degrees from each other, resulting in power characteristics of a 24-pulse rectification, without the use of inter-phase transformers.

A desired difference in inductance between the first rectification path 530 and the second rectification path 532 may be obtained in other ways. For example, a desired difference in inductance between the first rectification path 530 and the second rectification path 532 may be obtained by coupling an inductor between node 540 and the positive output of the power converter 500, coupling an inductor between the node 540 and the first rectifier 514 and an inductor between the node 540 and the second rectifier 516 (see FIG. 7), coupling inductors between the taps of the secondary windings of the transformer 502 and the second rectifier 516, coupling an inductor between node 542 and the negative output of the power converter 500, coupling an inductor between the node 542 and the first rectifier 514 and an inductor between the node 542 and the second rectifier 516, etc. As noted above, the use of leads of different lengths rather than inductive coils may be sufficient to obtain a desired difference in inductance between the first rectification path 530 and the second rectification path 532.

In an embodiment, the transformer 502 comprises three identical or substantially identical coils, each having a primary winding (e.g., primary winding A) and a split secondary winding (e.g., split secondary winding $A_1, A_2$). Non-identical coils may be employed, although typically identical or substantially identical coils may provide higher power quality. The secondary windings may be physically split as well as logically split, which may facilitate accessing the taps. In an embodiment, each portion of a split secondary winding may be identical. In an embodiment, the portions of a split secondary winding may be substantially identical. In an embodiment, portions of a split secondary winding may have a same number of turns. In an embodiment, portions of a split secondary winding may have a similar, but different, number of turns. In an embodiment, a primary winding (e.g., primary winding A) may be physically split, which in some embodiments provides better power quality by at least partially reducing harmonic distortion, for example at selected harmonics. For example, a physically split primary may have a split secondary winding sandwiched between portions of the split primary winding (see coil 810 of FIG. 8). A split primary winding may have two identical portions, may have two substantially similar portions having a similar, but different number of turns, etc. In an embodiment, the coils may be substantially identical with one of the coils having a polarity opposite of a polarity of the other coils. The windings of the transformer 502 may comprise, for example, copper, anodized aluminum, combinations thereof, etc.

For a 3-phase 115 Volt AC input signal at 400 Hz and an output of 28 volts DC to a load of 125 amps, the total harmonic distortion of an embodiment of the power converter 500 of FIG. 5 was in the range of 3% to 5%. The topology of the embodiment of FIG. 5 is much simpler than the topologies of the power converters 200, 300 of FIGS. 2 and 3, and the use of IPT transformers and filter inductors was avoided while achieving a lower harmonic distortion than Delta-Hex power converters such as the power converter 400 of FIG. 4. Superior electrical performance over the approaches of FIGS. 2 through 4 may be obtained as well. In an embodiment, voltage drops and power dissipation in IPT transformers and input inductors may be avoided, power efficiencies are improved, rectifier diodes share current equally (which facilitates handling overloads), EMI emissions are lower and AC current distortions are at an acceptable level.

Figure 6:
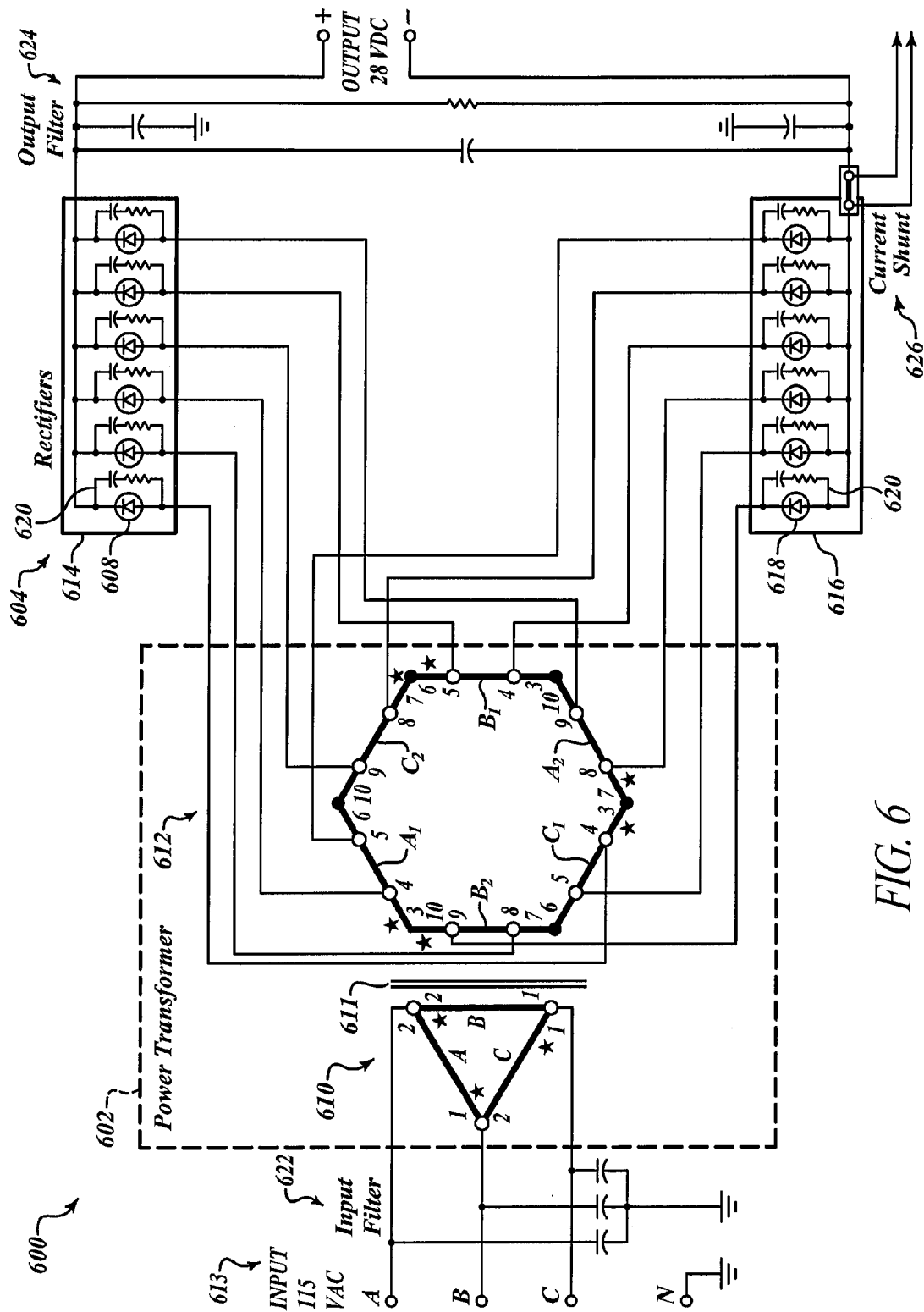
FIG. 6 is a schematic representation of an embodiment of a Delta-Hex power converter.

FIG. 6 is an electrical schematic of an embodiment of a power converter 600 employing a Delta-Hex topology. The power converter 600 comprises a transformer 602 and a rectifier stage 604. The transformer 602 comprises a primary 610, a secondary 612 and a core 611.

The primary 610 has first winding A, a second winding B, and a third winding C configured to couple to a 3-phase AC input signal 613 in a Delta configuration. Each winding A, B, C of the primary 610 has a respective first tap 1 and second tap 2. As illustrated, the taps 1, 2 of the windings A, B, C of the primary 610 are at the ends of the windings A, B, C. The reference number assigned to a tap or an end of a winding is not necessarily indicative of a turn count at the tap or end. The primary windings A, B, C typically have more than one turn. For example, a primary winding, such as winding A of primary 610, may have 61 turns in an embodiment. A polarity of each winding A, B, C of the primary 610 is indicated by a star *.

The secondary 612 comprises a first split secondary winding $A_1, A_2$, a second split secondary winding $B_1, B_2$, and a third split secondary winding $C_1, C_2$, coupled together at the ends in a hexagonal configuration. A current in the first winding A of the primary 610 induces a current in the first split winding $A_1, A_2$ of the secondary 612, a current in the second winding B of the primary 610 induces a current in the second split winding $B_1, B_2$ of the secondary 612, and a current in the third winding C of the primary 610 induces a current in the third split winding $C_1, C_2$ of the secondary 612. Other currents, generally of a lesser magnitude, may be induced in other windings.

As illustrated, each split secondary winding has multiple turns, a first portion (e.g., $A_1$) with half of the turns, two ends 3, 6 and two taps 4, 5, and a second portion (e.g., $A_2$) with half of the turns, two ends 7, 10 and two taps 8, 9, with the taps 4, 5, 8, 9 configured to couple to the rectification stage 604. In an embodiment, 8 total turns may be employed, with two turns between taps on a same portion of a secondary winding. Other numbers of turns may be employed and the taps in embodiments with different numbers of turns may be at different turns of the windings. A polarity of each winding of the secondary 612 is indicated by a star *.

A polarity of the second split winding $B_1, B_2$ of the secondary 612 is reversed with respect to a polarity of the first split winding $A_1, A_2$ and of the third split winding $C_1, C_2$ of the secondary 612. As discussed above, in Delta-Hex designs such as the one illustrated in FIG. 4, the minimum practical number of turns between taps was 3 or higher in order to obtain turn ratios closer to ideal ratios and thus avoid power quality issues arising from the deviations. In an embodiment, reversing the polarity of the second winding B of the primary 610 and the split second winding B1, B2 of the secondary 612 at least partially compensates for larger turn-ratio deviations and coil asymmetries, and thus facilitates obtaining acceptable power quality even when a minimum number of turns between taps coupled to the rectifier stage 604 is reduced to, for example, two turns. Reducing the number of turns between taps facilitates the use of transformers having windings with fewer turns, and thus facilitates smaller, lighter and less expensive transformers and power converters.

The rectification stage 604 comprises a first rectifier branch 614 and a second rectifier branch 616. As illustrated each rectifier branch 614, 616 includes six diodes 618 coupled in parallel with an optional snubber 620. Other rectifier branch configurations may be employed. As illustrated, each snubber comprises a resistor coupled in series with a capacitor. A snubber may comprise, for example, a 4 micro-Farad capacitor coupled in series with a 1 ohm resistor. Other snubbers may be employed and snubbers may be omitted in some embodiments.

Respective anodes of the diodes 608 of the first rectifier branch 614 are coupled to taps 4, 9 of the first split secondary winding $A_1$, $A_2$, to taps 4, 9 of the third split secondary winding $C_1$, $C_2$, and to taps 5, 8 of the second split secondary winding $B_1$, $B_2$. Respective cathodes of the diodes 618 of the second rectifier branch 616 are coupled to taps 5, 8 of the first split secondary winding $A_1$, $A_2$, to taps 5, 8 of the third split secondary winding $C_1$, $C_2$, and to taps 4, 9 of the second split secondary winding $B_1$, $B_2$.

The cathodes of the first rectifier branch 614 are coupled together and to a positive output of the power converter 600, and the anodes of the second rectifier branch 616 are coupled together and to a negative output of the power converter 600. As illustrated, the power converter is configured to provide an output of approximately 28 Volts DC in response to an input of 115 Volts AC. As illustrated, the power converter 600 has an optional input filter 622, an optional output filter 624 and an optional current shunt 626, which may be used, for example, to monitor the performance of the power converter 600 and/or load conditions. Other filter and shunt configurations may be employed.

In an embodiment, the transformer 602 comprises three identical coils or substantially identical coils, each having a primary winding (e.g., primary winding A) and a split secondary winding (e.g., split secondary winding $A_1$, $A_2$). Non-identical coils may be employed, although typically identical or substantially identical coils may provide higher power quality. The secondary windings may be physically split as well as logically split, which may facilitate accessing the taps. In an embodiment, each portion of a split secondary winding may be identical. In an embodiment, the portions of a split secondary winding may be substantially identical. In an embodiment, portions of a split secondary winding may have a same number of turns. In an embodiment, portions of a split secondary winding may have a similar, but different, number of turns. In an embodiment, a primary winding (e.g., primary winding A) may be physically split, which in some embodiments provides better power quality by reducing harmonic distortion, for example reducing distortion at selected harmonics. In an embodiment, a physically split primary may have a split secondary winding sandwiched between portions of the split primary winding (see coil 810 of FIG. 8). A split primary winding may have two identical portions, may have two substantially similar portions having a similar, but different number of turns, etc. In an embodiment, the coils may be substantially identical with one of the coils having a polarity opposite of a polarity of the other coils. The windings of the transformer 602 may comprise, for example, copper, anodized aluminum, combinations thereof, etc.

In simulations and testing applying a 3-phase 115 Volt AC input signal to an embodiment of the power converter 600 of FIG. 6, an output of approximately 28 volts DC was obtained with a total harmonic distortion in the range of 7% to 7.5%, and input current waveforms consistent with 12-pulse rectification. The topology of the embodiment of FIG. 6 is much simpler than the topologies of the power converters 200, 300 of FIGS. 2 and 3, and the use of IPT transformers and filter inductors was avoided while achieving a lower harmonic distortion that Delta-Hex power converters such as the power converter 400 of FIG. 4. Superior electrical performance over the topologies illustrated in FIGS. 2-4 may be obtained as well. In an embodiment, voltage drops and power dissipation in IPT transformers and input inductors may be avoided, power efficiencies are improved, rectifier diodes share current equally (which facilitates handing overloads), EMI emissions are lower and AC current distortions are at an acceptable level.

Figure 7:
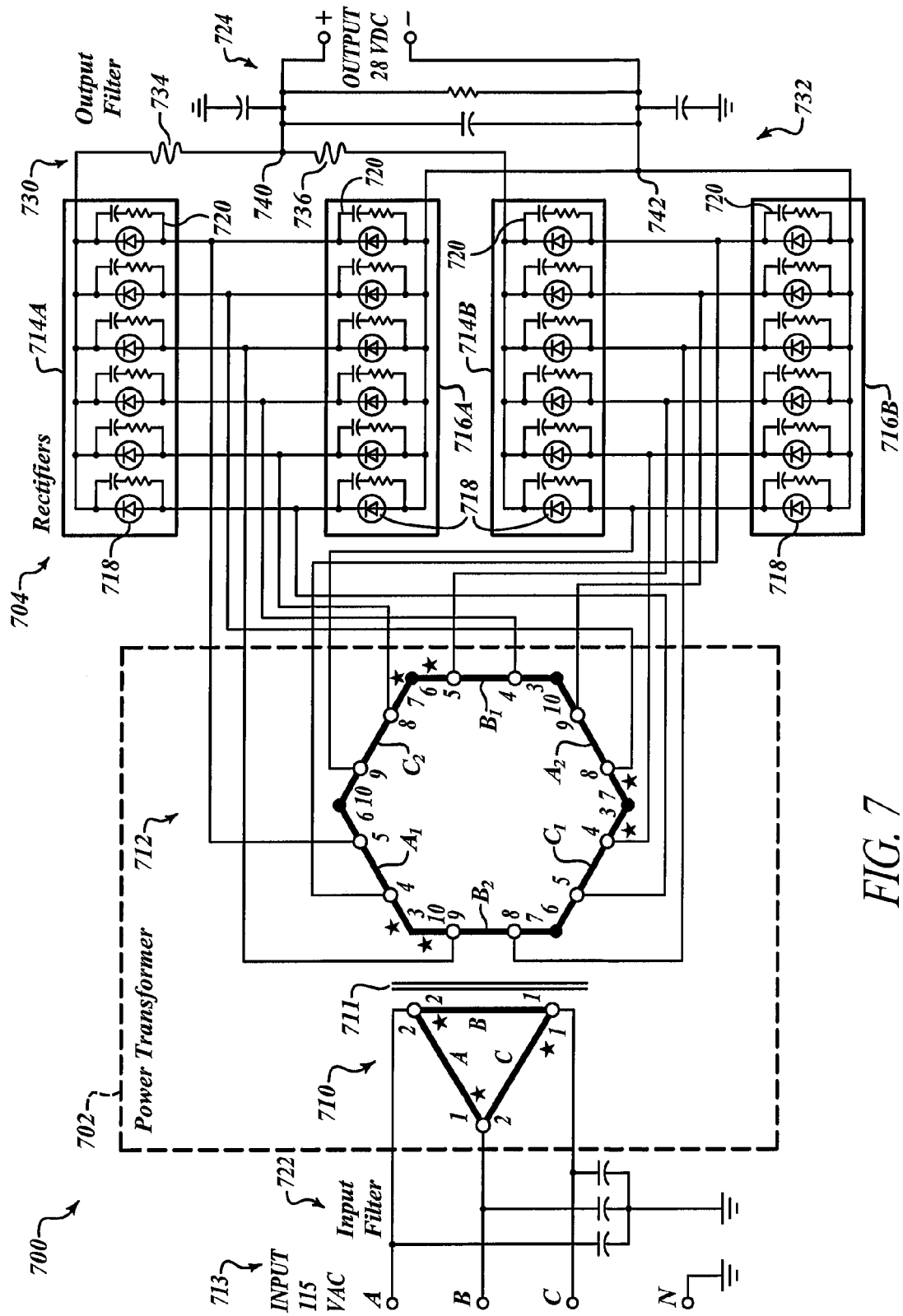
FIG. 7 is a schematic representation of an embodiment of a Delta-Hex power converter.

FIG. 7 is an electrical schematic of an embodiment of a power converter 700 employing a Delta-Hex topology. The power converter 700 comprises a transformer 702 and a rectifier stage 704. The transformer 702 comprises a primary 710, a secondary 712 and a core 711.

The primary 710 has first winding A, a second winding B, and a third winding C configured to couple to a 3-phase AC input signal 713 in a Delta configuration. Each winding A, B, C of the primary 710 has a respective first tap 1 and second tap 2. As illustrated, the taps 1, 2 of the windings A, B, C of the primary 710 are at the ends of the windings A, B, C. The reference number assigned to a tap or an end of a winding is not necessarily indicative of a turn count at the tap or end. The primary windings A, B, C typically have more than one turn. For example, a primary winding, such as winding A of primary 710, may have 61 turns in an embodiment. A polarity of each winding A, B, C of the primary 710 is indicated by a star *.

The secondary 712 comprises a first split secondary winding $A_1$, $A_2$, a second split secondary winding $B_1$, $B_2$, and a third split secondary winding $C_1$, $C_2$, coupled together at the ends in a hexagonal configuration. A current in the first winding A of the primary 710 induces a current in the first split winding $A_1$, $A_2$ of the secondary 712, a current in the second winding B of the primary 710 induces a current in the second split winding $B_1$, $B_2$ of the secondary 712, and a current in the third winding C of the primary 710 induces a current in the third split winding $C_1$, $C_2$ of the secondary 712. Other currents, generally of a lesser magnitude, may be induced in other windings (e.g., a current in the first winding A of the primary 710 may induce a current in the second split winding $B_1$, $B_2$ of the secondary 712, but this current will generally be of a lesser magnitude that a current induced in the first split winding $A_1$, $A_2$ of the secondary 712 by the current in the first winding A of the primary 710).

As illustrated, each split secondary winding has multiple turns, a first portion (e.g., $A_1$) with half of the turns, two ends 3, 6 and two taps 4, 5, and a second portion (e.g., $A_2$) with half of the turns, two ends 7, 10 and two taps 8, 9, with the taps 4, 5, 8, 9 configured to couple to the rectification stage 704. In an embodiment, 8 total turns may be employed, with two turns between taps on a same portion of a secondary winding. Other numbers of turns may be employed and the taps in embodiments with different numbers of turns may be at different turns of the windings. A polarity of each winding of the secondary 712 is indicated by a star *.

A polarity of the second split winding $B_1$, $B_2$ of the secondary 712 is reversed with respect to a polarity of the first split winding $A_1$, $A_2$ and of the third split winding $C_1$, $C_2$ of the secondary 712. As discussed above, Delta-Hex designs like the one illustrated in FIG. 4, the minimum practical number of turns between taps was 3 or higher in order to obtain turn ratios closer to ideal ratios and thus avoid power quality issues arising from the deviations. In an embodiment, reversing the polarity of the split second winding B1, B2 of the secondary 712 at least partially compensates for larger turn-ratio deviations and coil asymmetries, and thus facilitates obtaining acceptable power quality even when a minimum number of turns between taps coupled to the rectifier stage 704 is reduced to two turns. Reducing the number of turns between taps facilitates the use of transformers having windings with fewer turns, and thus facilitates smaller, lighter and less expensive transformers and power converters. Some embodiments may reverse the polarity of the primary winding B with respect to the primary windings A and C.

The rectification stage 704 comprises a first set of rectifier branches 714A, 714B coupled to a positive output of the power converted 700 and a second set of rectifier branches 716A, 716B coupled to a negative output of the power converter 700. As illustrated each rectifier branch 714A, 714B, 716A and 716B includes six diodes 718 coupled in parallel with an optional snubber 720. Other rectifier branch configurations may be employed. As illustrated, each snubber comprises a resistor coupled in series with a capacitor. A snubber may comprise, for example, a 4 micro-Farad capacitor coupled in series with a 1 ohm resistor. Other snubbers may be employed and snubbers may be omitted in some embodiments.

The taps 4, 5, 8, 9 of each secondary winding configured to couple to the rectifier stage 704 are each coupled to a respective anode of a diode 718 of the first set of rectifier branches 714A, 714B and to a respective cathode of a diode 718 of the second set of rectifier branches 716A, 716B.

The power converter 700 comprises a first rectification path 730 and a second rectification path 732 between taps of the secondary windings of the transformer 702 and outputs of the power converter 700, with the first and second rectification paths 730, 732 having different inductances. This difference in inductance provides an additional phase shift in the currents. As illustrated, the first rectification path 730 includes a coupling between cathodes of the diodes 718 of the first set of rectifier branches 714A, 714B and the positive output of the power converter 700, and the second rectification path 732 includes a coupling between anodes of the diodes 718 of the second set of rectifier branches 716A, 716B. As illustrated, the difference in inductance between the first rectification path 730 and the second rectification path 732 is obtained by coupling inductors 734, 736 into a portion of the rectification path 730 coupling the diodes 718 of the first set of rectifier branches 714A, 714B to the positive output of the power converter 700. For example, inductors having an inductance of approximately 5 micro-Henries may be employed. Other inductances may be employed, and a desired difference in inductance between the first rectification path 730 and the second rectification path 732 may be obtained in other ways. In some embodiments, a desired difference in inductance may be obtained by simply configuring a portion of the rectification path 730 coupling the first set of rectifier branches 714A, 714B to the positive output of the power converter 700 to have a longer, or shorter, length than a portion of the rectification path 732 coupling the second set of rectifier branches 716A, 716B to the negative output of the power converter 700. For example, half of the secondary outputs may be configured with longer leads than the other half of the secondary outputs. The difference in inductance may be selected such that the voltages/currents in the outputs of secondary 712 of the transformer 702 are shifted approximately 15 degrees from each other, resulting in power characteristics of a 24-pulse rectification. Addition examples of ways to obtain a desired difference in inductance between the first rectification path 730 and the second rectification path 732 include placing an inductor between node 740 and the positive output of the power converter 700, placing a pair of inductors between the node 742 and respective sets of rectifiers of the second set of rectifiers 716A, 716B, placing inductors between the taps of the secondary windings of the transformer 702 and the first set of rectifiers 714A, 714B (see FIG. 5), placing an inductor between node 742 and the negative output of the power converter 700, etc. As noted above, the use of leads of different lengths rather than inductive coils may be sufficient to obtain a desired difference in inductance between the first rectification path 730 and the second rectification path 732.

In an embodiment, the transformer 702 comprises three identical coils or substantially identical coils, each having a primary winding (e.g., primary winding A) and a split secondary winding (e.g., split secondary winding $A_1$, $A_2$). Non-identical coils may be employed, although typically identical or substantially identical coils may provide higher power quality. The secondary windings may be physically split as well as logically split, which may facilitate accessing the taps. In an embodiment, each portion of a split secondary winding may be identical. In an embodiment, the portions of a split secondary winding may be substantially identical. In an embodiment, portions of a split secondary winding may have a same number of turns. In an embodiment, portions of a split secondary winding may have a similar, but different, number of turns. In an embodiment, a primary winding (e.g., primary winding A) may be physically split, which in some embodiments provides better power quality by reducing harmonic distortion for example at selected harmonics. For example, a physically split primary may have a split secondary winding sandwiched between portions of the split primary winding (see FIG. 8). A split primary winding may have two identical portions, may have two substantially similar portions having a similar, but different number of turns, etc. In an embodiment, the coils may be substantially identical with one of the coils having a secondary winding with a polarity opposite of a polarity of the secondary windings of the other coils. The windings of the transformer 702 may comprise, for example, copper, anodized aluminum, combinations thereof, etc.

As illustrated, the power converter 700 is configured to provide an output of approximately 28 Volts DC in response to an input of 115 Volts AC. As illustrated, the power converter 700 has an optional input filter 722 and an optional output filter 724. Other filter configurations may be employed.

In simulations and testing applying a 3-phase 115 Volt AC input signal to an embodiment of the power converter 700 of FIG. 7, an output of approximately 28 volts DC was obtained with a total harmonic distortion in the range of 3.3% to 4.2%, with input current waveforms consistent with 24-pulse rectification. The topology of the embodiment of FIG. 7 is much simpler than the topologies of the power converters 200, 300 of FIGS. 2 and 3, and the use of IPT transformers and filter inductors was avoided while achieving a lower harmonic distortion that Delta-Hex power converters such as the power converter 400 of FIG. 4. Superior electrical performance over the topologies of FIGS. 2-4 may be obtained as well. In an embodiment, voltage drops and power dissipation in IPT transformers and input inductors may be avoided, power efficiencies are improved, rectifier diodes share current equally (which facilitates handing overloads), EMI emissions are lower and AC current distortions are at an acceptable level.

Figure 8:
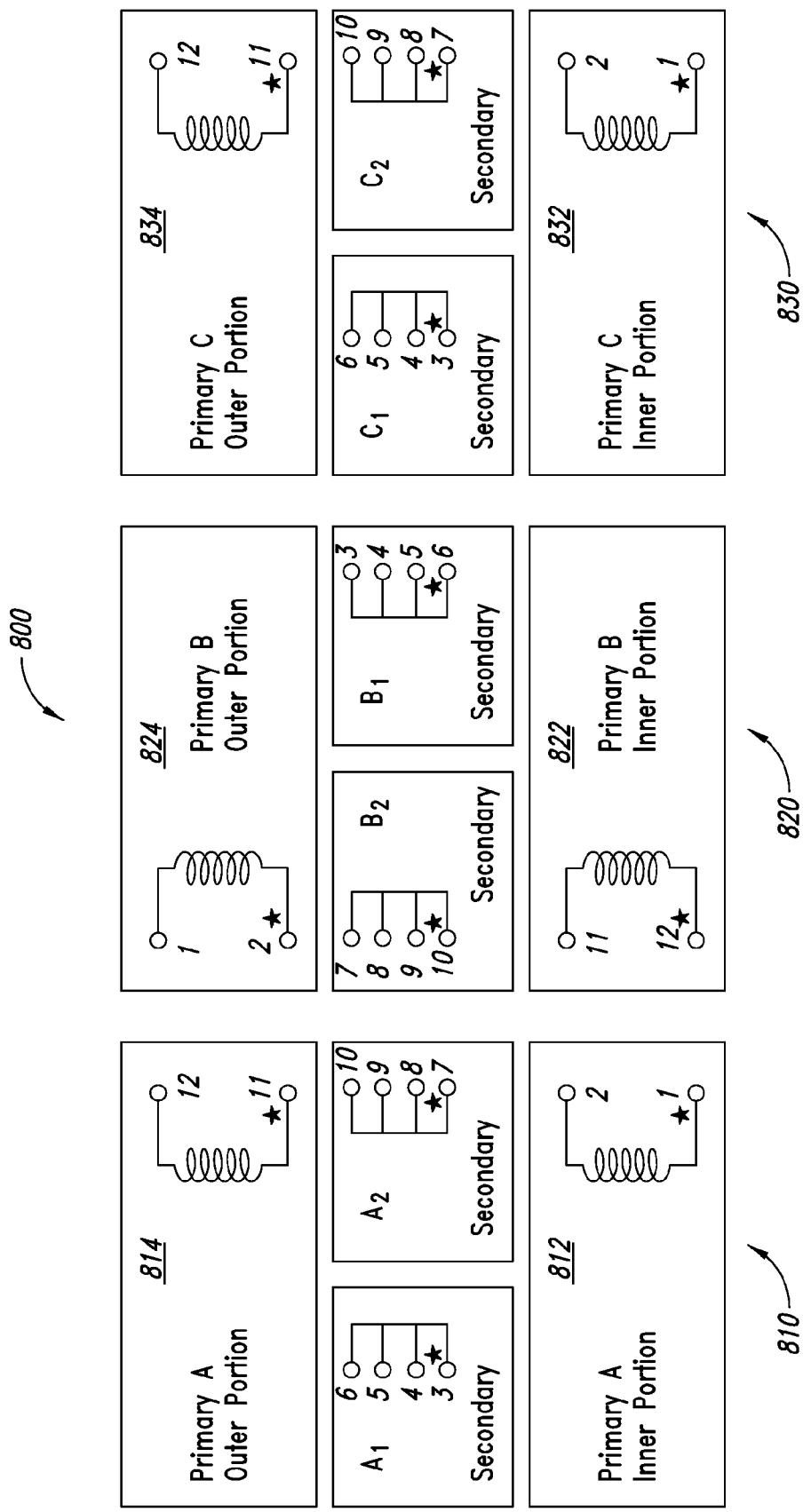
FIG. 8 is a schematic representation of an embodiment of a transformer.
Figure 9:
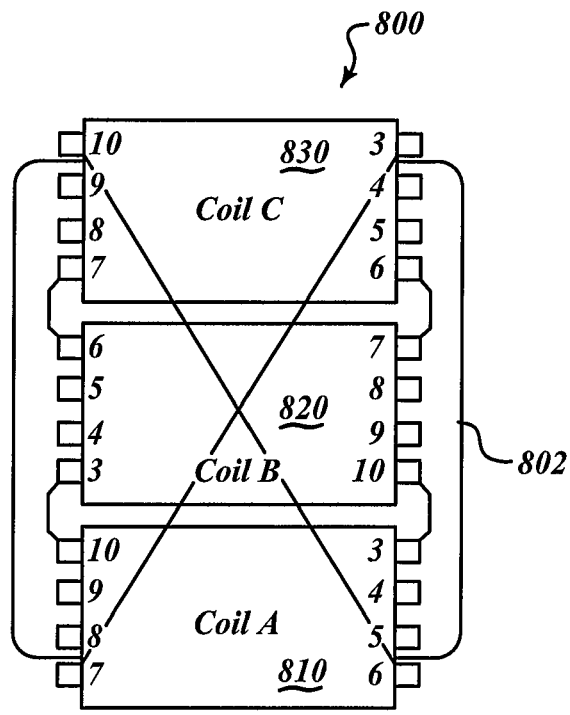
FIG. 9 is a top view of an embodiment of a transformer.

FIG. 8 is a schematic view of an embodiment of a transformer 800, suitable for use, for example, in embodiments of the power converters illustrated in FIGS. 5-7. FIG. 9 is a top view of an embodiment of the transformer 800 of FIG. 8.

The transformer 800 comprises three coils 810, 820, 830 wound on a core 802. The core 802 may, for example, take the form of a magnetizable or ferrite material, for instance a rod or bar of ferrite, samarium cobalt or neodymium-iron-boron. While not illustrated, the transformer 800 may include a housing.

The first coil 810 comprises a primary winding A split into an inner winding portion 812 and an outer winding portion 814. The inner winding portion 812 comprises two taps 1, 2 positioned at the ends of the inner winding portion 812. The outer winding portion 814 comprises two taps 11, 12 positioned at the ends of the outer winding portion 814. The primary winding A has a first polarity indicated by a star *. The total number of turns of the primary A may be selected to facilitate obtaining a desired turns ratio (see, for example, Table 1, below). The total number of turns of the primary winding A may be, for example, 181 turns, 121 turns, 61 turns, etc. The total number of turns of the inner winding portion 812 of the primary winding A may be, for example, 90, 91, 92, 60, 61, 62, 30, 31, or 32 turns, and the total number of turns of the outer portion 814 of the primary winding A may be, for example, 91, 90, 89, 61, 60, 59, 31, 30, or 29 turns. Other total numbers of turns and numbers of turns in respective portions may be employed. The first coil 810 comprises a split secondary $A_1, A_2$ having four ends 3, 6, 7, 10 and four tabs 4, 5, 8, 9. As illustrated, the split secondary $A_1, A_2$ is sandwiched between the first portion 812 and the second portion 814 of the primary A. The secondary winding $A_1, A_2$ has the first polarity as indicated by a star *. The total number of turns of the secondary winding $A_1, A_2$, may be, for example, 22, 16 or 8, with each portion $A_1, A_2$ typically having half of the total turns, for example 11, 8 or 4 turns. Other total numbers of turns and numbers of turns in respective portions may be employed.

The second coil 820 comprises a primary winding B split into an inner winding portion 822 and an outer winding portion 824. The inner winding portion 822 comprises two taps 11, 12 positioned at the ends of the inner winding portion 822. The outer winding portion 824 comprises two taps 1, 2 positioned at the ends of the outer winding portion 824. The primary winding B has a second polarity indicated by a star *, and different from the first polarity. The total number of turns of the primary B may be selected to facilitate obtaining a desired turns ratio (see Table 1, below). The total number of turns of the primary winding B may be, for example, 181 turns, 121 turns, 61 turns, etc. The total number of turns of the inner winding portion 822 of the primary winding B may be, for example, 90, 91, 92, 60, 61, 62, 30, 31, or 32 turns, and the total number of turns of the outer portion 824 of the primary winding B may be, for example, 91, 90, 89, 61, 60, 59, 31, 30, or 29 turns. Other total numbers of turns and numbers of turns in respective portions may be employed. The second coil 820 comprises a split secondary $B_1, B_2$ having four ends 3, 6, 7, 10 and four taps 4, 5, 8, 9. As illustrated, the split secondary $B_1, B_2$ is sandwiched between the first portion 822 and the second portion 824 of the primary B. The secondary winding $B_1, B_2$ has the second polarity as indicated by a star *. The total number of turns of the secondary winding $B_1, B_2$, may be, for example, 22, 16 or 8, with each portion $B_1, B_2$ typically having half of the total turns, for example 11, 8 or 4 turns. Other total numbers of turns and numbers of turns in respective portions may be employed.

The third coil 830 comprises a primary winding C split into an inner winding portion 832 and an outer winding portion 834. The inner winding portion 832 comprises two taps 1, 2 positioned at the ends of the inner winding portion 832. The outer winding portion 834 comprises two taps 11, 12 positioned at the ends of the outer winding portion 834. The primary winding C has the first polarity indicated by a star *. The total number of turns of the primary C may be selected to facilitate obtaining a desired turns ratio (see Table 1, below). The total number of turns of the primary winding C may be, for example, 181 turns, 121 turns, 61 turns, etc. The total number of turns of the inner winding portion 832 of the primary winding C may be, for example, 90, 91, 92, 60, 61, 62, 30, 31, or 32 turns, and the total number of turns of the outer portion 834 of the primary winding C may be, for example, 91, 90, 89, 61, 60, 59, 31, 30, or 29 turns. Other total numbers of turns and numbers of turns in respective portions may be employed. The third coil 830 comprises a split secondary $C_1, C_2$ having four ends 3, 6, 7, 10 and four taps 4, 5, 8, 9. As illustrated, the split secondary $C_1, C_2$ is sandwiched between the first portion 832 and the second portion 834 of the primary C. The secondary winding $C_1, C_2$ has the first polarity as indicated by a star *. The total number of turns of the secondary winding $C_1, C_2$, may be, for example, 22, 16 or 8, with each portion $C_1, C_2$ typically having half of the total turns, for example 11, 8 or 4 turns. Other total numbers of turns and numbers of turns in respective portions may be employed.

The first coil 810, the second coil 820 and the third coil 830 are positioned next to each in a row, with the second coil 820 positioned between the first coil 810 and the third coil 830.

The first, second and third coils 810, 820, 830 may typically be identical or substantially identical, with the polarity of the second coil 820 being opposite of a polarity of the first and third coils 810, 830 in an embodiment.

FIG. 9 is a top view of an embodiment of the transformer 800 of FIG. 8, suitable for use, for example, in embodiments of the power converters illustrated in FIGS. 5-7. The transformer comprises a core 802 having three coils wound on it, which as illustrated are the first, second and third coils 810, 820, 830 of FIG. 8. FIG. 9 shows the couplings of the secondary windings of the coils 810, 820, 830 to each other in an embodiment. The third tap 3 of the third coil 830 is coupled to the seventh tap 7 of the first coil 810, the sixth tap 6 of the third coil 830 is coupled to the seventh tap 7 of the second coil 820, the seventh tap 7 of the third coil 830 is coupled to the sixth tap 6 of the second coil 820, the tenth tap 10 of the third coil 830 is coupled to the sixth tap 6 of the first coil 810, the third tap 3 of the first coil 810 is coupled to the tenth tap 10 of the second coil 820 and the tenth tap 10 of the first coil 810 is coupled to the third tap 3 of the second coil 820. The fourth tap 4, the fifth tap 5, the eighth tap 8, and the ninth tap 9 of the respective coils 810, 820, 830 are available for coupling to a rectifier stage (see, for example, rectifier stage 704 of FIG. 7).

Figure 10:
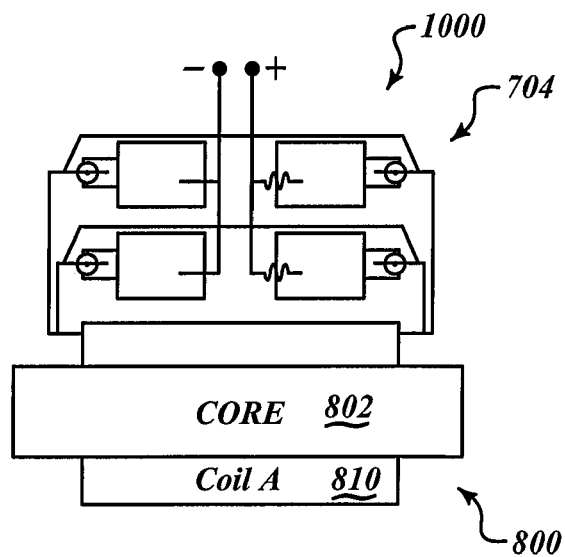
FIG. 10 is a front view of an embodiment of a Delta-Hex power converter.
Figure 11:
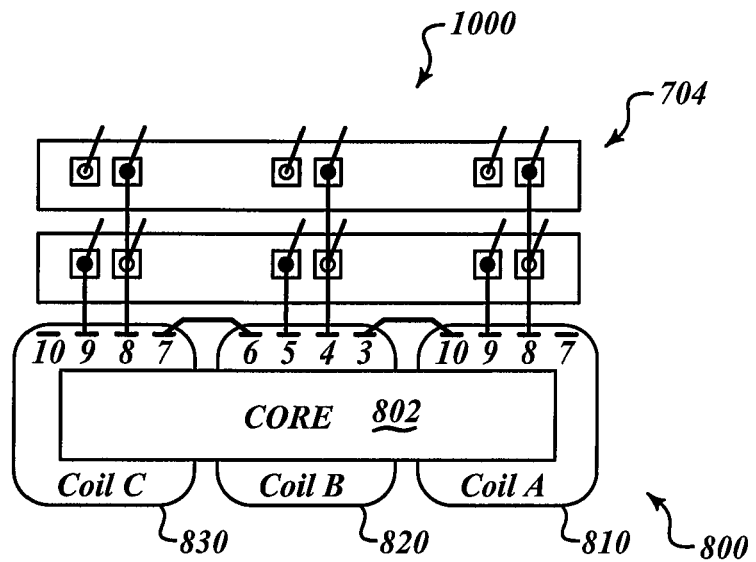
FIG. 11 is a first side view of the embodiment of a Delta-Hex power converter of FIG. 10.
Figure 12:
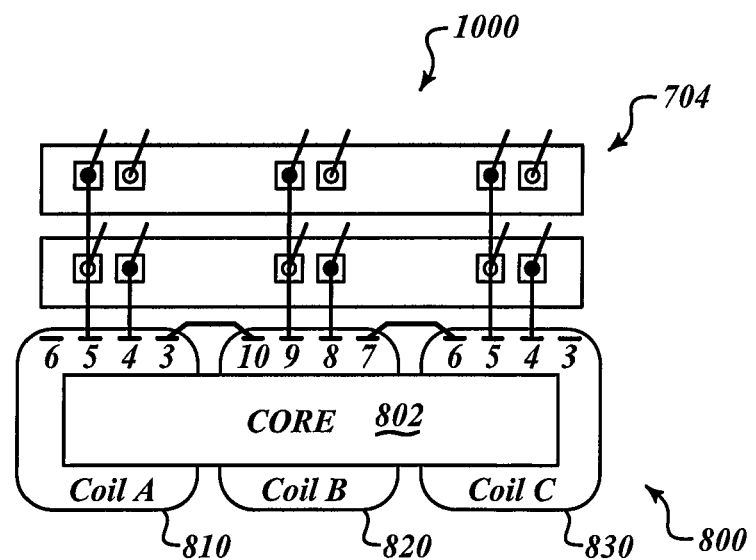
FIG. 12 is a second side view of the embodiment of a Delta-Hex power converter of FIG. 10.

FIGS. 10 through 12 show front and side views of an embodiment of a power converter 1000, and illustrates an example layout of the components of a transformer and rectifier suitable for use, for example, in the embodiment of a power converter 700 of FIG. 7. As illustrated, the transformer employs the physical configuration of the embodiment of a transformer 800 of FIGS. 8 and 9 and the rectifier employs the electrical configuration of the rectifier 704 of the power converter 700 of FIG. 7.

Figure 13:
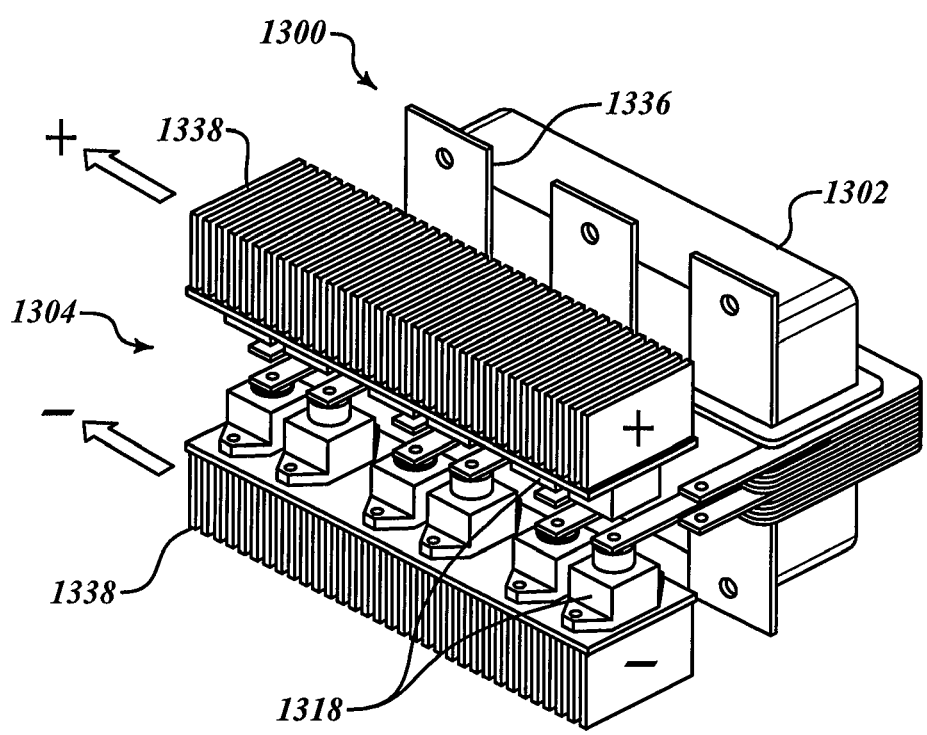
FIG. 13 is an isometric view of an embodiment of a Delta-Hex power converter.

FIG. 13 is an isometric view of an embodiment of a power converter 1300. The power converter 1300 comprises a transformer 1302 having a coil heat sink 1336, and a rectifier 1304 including a plurality of diodes 1318 coupled to diode heat sinks 1338. As illustrated, the diode heat sinks 1338 are electrically coupled to the diodes 1318, and are configured as bus bars for positive and negative DC outputs of the power converter 1300. While 12 diodes are shown, additional diodes may be employed in some embodiments. The power converter may employ, for example, a Delta-Hex topology such as the topologies illustrated in FIGS. 5-7, etc.

FIGS. 14-19 graphically illustrate typical differences in power-quality produced by power converters employing 6-pulse, 12-pulse and 24-pulse conversion topologies.

Figure 14:
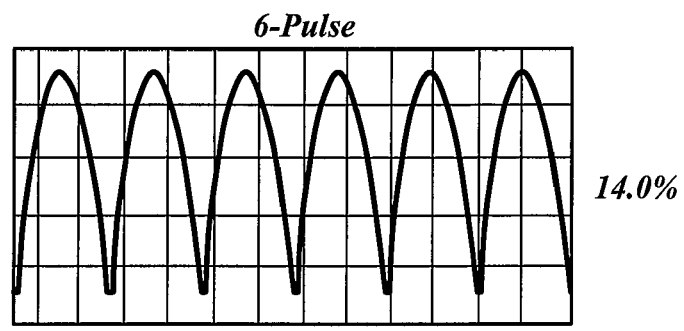
FIG. 14 is a graphical representation of a ripple in a DC output of an embodiment of a 6-pulse power converter.
Figure 15:
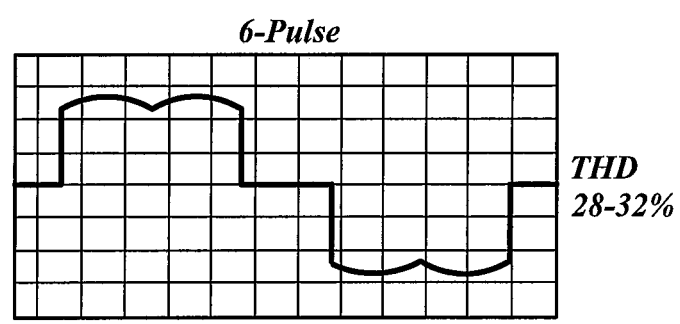
FIG. 15 is a graphical representation of an input current of an embodiment of a 6-pulse power converter.

FIG. 14 is a graphical representation of a ripple in a DC output of an embodiment of a 6-pulse power converter. The DC ripple as illustrated is about 14 percent of the output voltage. FIG. 15 is a graphical representation of an input current of an embodiment of a 6-pulse power converter. The total harmonic distortion as illustrated is approximately 28 to 32 percent.

Figure 16:
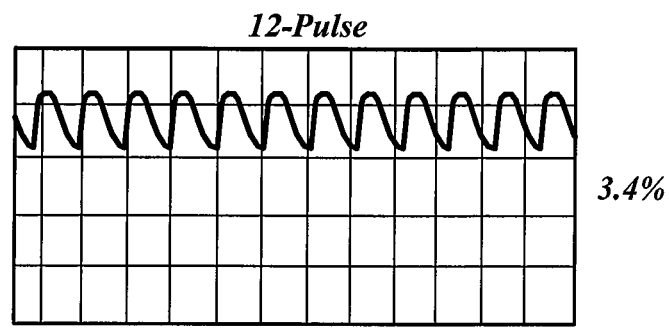
FIG. 16 is a graphical representation of a ripple in a DC output of an embodiment of a 12-pulse power converter.
Figure 17:
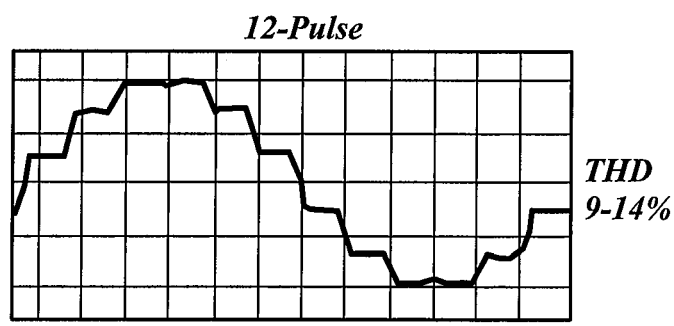
FIG. 17 is a graphical representation of an input current of an embodiment of a 12-pulse power converter.

FIG. 16 is a graphical representation of a ripple in a DC output of an embodiment of a 12-pulse power converter. The DC ripple as illustrated is about 3.4 percent of the output voltage. FIG. 17 is a graphical representation of an input current of an embodiment of a 12-pulse power converter. The total harmonic distortion as illustrated is approximately 9 to 14 percent.

Figure 18:
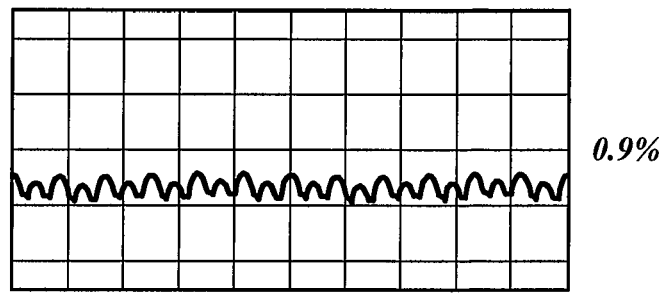
FIG. 18 is a graphical representation of a ripple in a DC output of an embodiment of a 24-pulse power converter.
Figure 19:
FIG. 19 is a graphical representation of an input current of an embodiment of a 24-pulse power converter.

FIG. 18 is a graphical representation of a ripple in a DC output of an embodiment of a 24-pulse power converter. The DC ripple as illustrated is about 0.9 percent. FIG. 19 is a graphical representation of an input current of an embodiment of a 24-pulse power converter. The total harmonic distortion as illustrated is approximately 3 to 5 percent.

Table 1 provides some examples of transformer winding turns, tap turn placements, and calculated resulting tap/center errors. Simulations of embodiments of power converters in a Delta-Hex configuration such as those illustrated in FIGS. 5 through 12, produced acceptable power quality for tap center errors as high as 7.5%. In practice, coils with a total number of turns in the primary windings of 181 or less may typically be employed in power converters used in avionics applications. For topologies like that shown in FIG. 4, the power quality is border line when the number of turns is 181, and generally too low when the number of turns is less than 181. In contrast, the power quality for embodiments of the Delta-Hex topologies shown in FIGS. 5-7 is generally good enough to use in applications requiring a high-current, low voltage supply, such as avionics applications.

TABLE 1

| Calculated Number of Turns | | | | Tap Center Error Tap/Center |
|---|---|---|---|---|
| Primary | Secondary | | | Error |
| Total | Total/Section | L-R Taps | Center | [%] |
| 61 | 8/4 | 1 | 2 | 6.4 |
| 121 | 16/8 | 2 | 4 | 6.4 |
| 181 | 22/11 | 3 | 5 | 2.5 |
| 241 | 30/15 | 4 | 7 | 0.3 |
| 302 | 38/19 | 5 | 9 | 1.1 |
| 362 | 46/23 | 6 | 11 | 2.0 |
| 422 | 52/26 | 7 | 12 | 1.2 |

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other transformers, rectifiers and power converters, not necessarily the exemplary transformers, rectifiers and power converters generally described above. The teachings provided herein of the various embodiments can be applied to other circuits, including other converter circuits, not necessarily the exemplary converter circuits generally described above.

The various embodiments described above can be combined to provide further embodiments. Aspects of the embodiments can be modified, if necessary, to employ systems, circuits and concepts of the various patents, applications and publications discussed herein to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A power converter, comprising:
   a transformer having:
      three primary windings configured to receive respective phases of a three-phase alternating current (AC) input signal in a delta configuration; and
      three secondary windings each split into two portions, the portions of the secondary windings coupled together into a closed regular hexagon, with each portion of each secondary winding having at least two taps and the taps distributed at regular angles on the closed regular hexagon;
   a first rectification path coupled between taps of the secondary windings and a positive output of the power converter and having an inductance; and
   a second rectification path coupled between taps of the secondary windings and a negative output of the power converter and having an inductance different from the inductance of the first rectification path, wherein in operation, the difference in inductance causes the first and second rectification paths to convert twelve-phase AC signals into twenty-four pulse direct-current voltage.

2. The power converter of claim 1 wherein the difference in inductance is selected to cause outputs of the secondary windings to be shifted approximately 15 degrees from each other.

3. The power converter of claim 1 wherein,
   the first rectification path comprises a first plurality of rectifiers coupled to the positive output; and
   the second rectification path comprises a second plurality of rectifiers coupled to the negative output, wherein an inductance of a coupling path between the first plurality of rectifiers and the positive output is different than an inductance of a coupling path between the second plurality of rectifiers and the negative output.

4. The power converter of claim 3 wherein a length of a lead of the coupling path between the first plurality of rectifiers and the positive output is different than a length of a lead of the coupling path between the second plurality of rectifiers and the negative output.

5. The power converter of claim 1 wherein the first rectification path comprises:
   a first plurality of rectifiers having cathodes coupled together;
   an inductor coupled between the cathodes of the first plurality of rectifiers and the positive output;
   a second plurality of rectifiers having cathodes coupled together; and an inductor coupled between the cathodes of the second plurality of rectifiers and the positive output.

6. The power converter of claim 1 wherein one of the secondary windings has a polarity opposite of a polarity of the other secondary windings.

7. The power converter of claim 6 wherein each primary winding is split into two portions and each secondary winding is sandwiched between two portions of a corresponding primary winding.

8. The power converter of claim 1 wherein each primary winding is split into two portions and each secondary winding is sandwiched between two portions of a corresponding primary winding.

9. The power converter of claim 1 wherein,
the first rectification path comprises 12 rectifiers, each coupled to a respective tap of the secondary windings through respective couplings having a first inductance; and
the second rectification path comprises 12 rectifiers, each coupled to a respective tap of the secondary windings through respective couplings having a second inductance different that the first inductance.

10. The power converter of claim 1 wherein the first rectification path comprises a lead having a length different than a length of a corresponding lead of the second rectification path.

11. The power converter of claim 1 wherein the inductance of the first rectification path is approximately five times the inductance of the second rectification path.

12. The power converter of claim 1 wherein the taps of the secondary windings are distributed at substantially identical central angles on the regular hexagon.

13. The power converter of claim 1 wherein two taps on one portion of a secondary winding are on adjacent turns of the portion of the secondary winding.

14. The power converter of claim 1 wherein the transformer comprises three substantially identical coils, each coil comprising one of the primary windings and a corresponding secondary winding.

15. The power converter of claim 14 wherein the coils are positioned next to each other in a row and a center coil has a polarity different than a polarity of the other coils.

16. A method, comprising:
coupling three primary windings of a transformer together in a differential configuration to receive respective phases of a three-phase alternating current;
coupling split portions of three secondary windings of the transformer together into a regular hexagonal configuration;
providing a plurality of taps distributed at regular angles on the secondary windings, each split secondary winding portion having at least two taps;
forming a first rectification path between the plurality of taps and a positive output, the first rectification path having an inductance; and
forming a second rectification path between the plurality of taps and a negative output, the second rectification path having an inductance different than the inductance of the first rectification path, wherein, in operation, the difference in inductance causes the first and second rectification paths to convert twelve-phase AC power signals into twenty-four pulse direct-current voltage.

17. The method of claim 16 wherein,
the first rectification path comprises a first plurality of rectifiers coupled to the positive output; and
the second rectification path comprises a second plurality of rectifiers coupled to the negative output, wherein an inductance of a coupling path between the first plurality of rectifiers and the positive output is different than an inductance of a coupling path between the second plurality of rectifiers and the negative output.

18. The method of claim 17 wherein a length of a lead of the coupling path between the first plurality of rectifiers and the positive output is different than a length of a lead of the coupling path between the second plurality of rectifiers and the negative output.

19. The method of claim 16 wherein the first rectification path comprises:
a first plurality of rectifiers having cathodes coupled together;
an inductor coupled between the cathodes of the first plurality of rectifiers and the positive output;
a second plurality of rectifiers having cathodes coupled together; and
an inductor coupled between the cathodes of the second plurality of rectifiers and the positive output.

20. The method of claim 16 wherein the transformer comprises first, second and third coils and the method comprises:
positioning the first, second and third coils together in a row with the second coil separating the first and third coils, the second coil having a polarity different than a polarity of the first coil and of the third coil.

21. The method of claim 16 wherein the primary windings are split into first and second primary portions and the portions of the each secondary winding are sandwiched between first and second primary portions of a respective primary winding.

22. The method of claim 16 wherein the difference in inductance is selected to cause outputs of the secondary windings to be shifted approximately 15 degrees from each other.

23. A power converter, comprising:
means for converting three-phase alternating current (AC) power signals into multi-phase AC power signals;
first means for rectifying multi-phase AC power signals;
second means for rectifying multiphase AC power signals;
first means for coupling to couple the means for converting to the first means for rectifying and to couple the first means for rectifying to a first output of the power converter; and
second means for coupling to couple the means for converting to the second means for rectifying and to couple the second means for rectifying to a second output of the power converter, wherein the first means for coupling has an inductance different than an inductance of the second means for coupling, wherein the difference in inductance causes the power converter, in operation, to convert twelve-phase AC power signals into twenty-four pulse direct-current voltage.

24. The power converter of claim 23 wherein the means for converting comprises a transformer having:
a primary including three primary windings configured to couple to respective phases of an AC power signal in a delta configuration; and
a secondary including three secondary windings, each secondary winding corresponding to a respective primary winding and split into two portions, wherein the portions of the secondary windings are coupled together into a closed hexagon and each portion of a secondary winding comprises at least two taps.

25. The power converter of claim 24 wherein one of the primary windings has a polarity opposite of the other primary windings and the corresponding secondary winding has a polarity opposite of the other secondary windings.

26. The power converter of claim 25 wherein the primary windings are each split in two portions and the two portions of the corresponding secondary winding are sandwiched between the two portions of the corresponding primary winding.

27. The power converter of claim 23 wherein the first means for coupling comprises an inductor coupled between the first means for rectifying and the first output of the power converter.

28. The power converter of claim 23 wherein the difference in inductance is configured to cause outputs of the secondary windings to be shifted approximately 15 degrees from each other.

29. A power converter, comprising:
a transformer having:
three primary windings in a delta configuration and coupled to respective phases of a three-phase alternating current (AC) input; and
three secondary windings each split into two portions, the portions of the secondary windings coupled together into a closed regular hexagon, with each portion of each secondary winding having at least two taps with the taps distributed at regular angles on the closed regular hexagon;
a first rectification path coupled between taps of the secondary windings and a positive output of the power converter and having an inductance; and
a second rectification path coupled between taps of the secondary windings and a negative output of the power converter and having an inductance different from the inductance of the first rectification path, wherein the inductance of one of the rectification paths is approximately five times the inductance of the other rectification path and the difference in inductance causes the power converter, in operation, to convert 12-phase AC power signals into 24 pulse direct-current voltage.

30. The power converter of claim 29 wherein,
the first rectification path comprises a first plurality of rectifiers coupled to the positive output; and
the second rectification path comprises a second plurality of rectifiers coupled to the negative output, wherein an inductance of a coupling path between the first plurality of rectifiers and the positive output is different than an inductance of a coupling path between the second plurality of rectifiers and the negative output.

31. The power converter of claim 30 wherein a length of a lead of the coupling path between the first plurality of rectifiers and the positive output is different than a length of a lead of the coupling path between the second plurality of rectifiers and the negative output.

32. The power converter of claim 29 wherein the first rectification path comprises:
a first plurality of rectifiers having cathodes coupled together;
an inductor coupled between the cathodes of the first plurality of rectifiers and the positive output;
a second plurality of rectifiers having cathodes coupled together; and
an inductor coupled between the cathodes of the second plurality of rectifiers and the positive output.

33. The power converter of claim 29 wherein one of the secondary windings has a polarity opposite of a polarity of the other secondary windings.

34. The power converter of claim 29 wherein the taps of the secondary windings are distributed at substantially identical central angles on the regular hexagon.

* * * * *